United States Patent
Shimamura et al.

(10) Patent No.: US 11,978,868 B2
(45) Date of Patent: May 7, 2024

(54) SYSTEM AND METHOD FOR MANAGEMENT OF REMAINING BATTERY CAPACITY BY WIRELESSLY TRANSMITTING TERMINAL ID OF TERMINAL ON BATTERY

(71) Applicant: Nippon Telegraph and Telephone Corporation, Tokyo (JP)

(72) Inventors: Toshishige Shimamura, Tokyo (JP); Yuichi Okabe, Tokyo (JP); Tsuyoshi Yamamoto, Tokyo (JP); Yuzo Ishii, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 711 days.

(21) Appl. No.: 17/257,354

(22) PCT Filed: Jun. 21, 2019

(86) PCT No.: PCT/JP2019/024732
§ 371 (c)(1),
(2) Date: Dec. 31, 2020

(87) PCT Pub. No.: WO2020/012919
PCT Pub. Date: Jan. 16, 2020

(65) Prior Publication Data
US 2021/0151813 A1     May 20, 2021

(30) Foreign Application Priority Data
Jul. 9, 2018   (JP) ................................. 2018-130023

(51) Int. Cl.
*H01M 10/48*      (2006.01)
*G06K 19/07*      (2006.01)
(Continued)

(52) U.S. Cl.
CPC ...... *H01M 10/488* (2013.01); *G06K 19/0702* (2013.01); *G06K 19/0723* (2013.01);
(Continued)

(58) Field of Classification Search
CPC .. H01M 10/488; H01M 10/425; H02J 7/0048; G06K 19/0702; G06K 19/0723
See application file for complete search history.

(56) References Cited

U.S. PATENT DOCUMENTS

2015/0358214 A1* 12/2015 Toya ..................... H02J 7/0013
709/223
2016/0350820 A1    12/2016 Okano et al.
(Continued)

FOREIGN PATENT DOCUMENTS

JP      H09284375 A    10/1997
JP      200633409 A     2/2006
(Continued)

OTHER PUBLICATIONS

EDN Japan, "Battery level indicator IC," Jun. 21, 2018, 7 pages.
(Continued)

*Primary Examiner* — Michael Jung
(74) *Attorney, Agent, or Firm* — Slater Matsil, LLP

(57) ABSTRACT

A terminal mounted in advance on a battery of an instrument that is a management target wirelessly transmits a battery state obtained by detecting an electric property related to a remaining battery amount of the battery and a terminal ID for identifying the terminal, and a management device displays remaining amount information related to the battery remaining amount on a screen based on the terminal ID and the battery state received from the terminal. This allows a user to easily figure out the remaining amount of a battery being used in an existing instrument.

20 Claims, 13 Drawing Sheets

(51) Int. Cl.
*H01M 10/42* (2006.01)
*H02J 7/00* (2006.01)
*G06F 3/14* (2006.01)
*G06K 7/10* (2006.01)

(52) U.S. Cl.
CPC ......... *H01M 10/425* (2013.01); *H02J 7/0048* (2020.01); *G06F 3/14* (2013.01); *G06K 7/10297* (2013.01); *H01M 2010/4271* (2013.01); *H01M 2010/4278* (2013.01)

(56) References Cited

U.S. PATENT DOCUMENTS

| | | | |
|---|---|---|---|
| 2017/0127224 A1* | 5/2017 | Nakano | H04B 5/0037 |
| 2017/0144562 A1* | 5/2017 | Thomas | H01M 10/4257 |
| 2018/0040227 A1 | 2/2018 | Ohgishi et al. | |
| 2018/0183252 A1* | 6/2018 | Kim | H01M 10/488 |

FOREIGN PATENT DOCUMENTS

| | | | |
|---|---|---|---|
| JP | 2016218919 A | 12/2016 | |
| JP | 2018026780 A | 2/2018 | |

OTHER PUBLICATIONS

Toyo Technical Power, "Principle of Electrochemical Impedance Measurement," Jun. 21, 2018, 9 pages.
Yasutomo Sasaki, "Commenced mass production and shipment of devices that can make battery-powered products into jots"MaBeeee M, Jun. 2018, 13 pages.

* cited by examiner

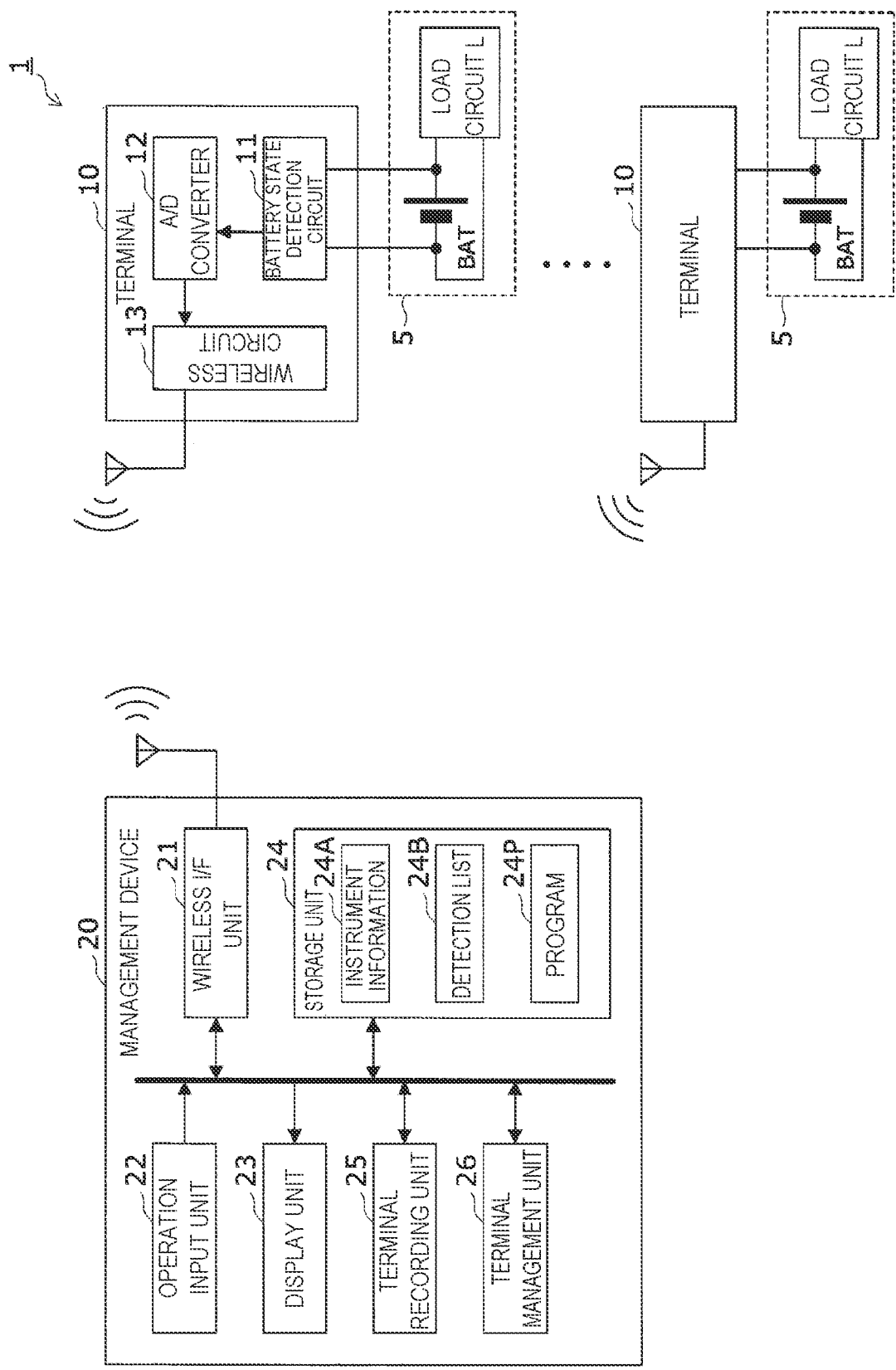

| TERMINAL ID | BATTERY STATE DATA | RECEPTION TIME | REMAINING AMOUNT INDEX |
|---|---|---|---|
| | ⋮ | | |

SYSTEM AND METHOD FOR MANAGEMENT OF REMAINING BATTERY CAPACITY BY WIRELESSLY TRANSMITTING TERMINAL ID OF TERMINAL ON BATTERY

CROSS-REFERENCE TO RELATED APPLICATIONS

This application is a national phase entry of PCT Application No. PCT/JP2019/024732, filed on Jun. 21, 2019, which claims priority to Japanese Application No. 2018-130023, filed on Jul. 9, 2018, which applications are hereby incorporated herein by reference.

TECHNICAL FIELD

The present invention relates to a remaining-battery-amount management technology for managing the remaining amount of a battery used as a power source of an instrument.

BACKGROUND

Recently, a secondary battery, which is rechargeable, has been increasingly used as a power source of an instrument brought with a user in place of a primary battery such as a typical dry-cell battery. For example, an electronic device such as a cellular phone or a smartphone is sold in a set with a dedicated charger, and the user determines whether charging with the charger is needed based on display of the remaining amount of a battery of the electronic device.

In a conventionally disclosed technology (refer to Patent Literature 1, for example), such a cellular phone determines whether a secondary battery needs to be charged in a predetermined duration from the current time based on the use situation of the cellular phone, and when having determined that the charging is needed, gives notification for prompting the user to perform charging. In another disclosed technology (refer to Patent Literature 2, for example), an alert sound that prompts charging is output when a cellular phone is not charged at a time set in advance, and notification of uncompleted charging is given when the cellular phone is not charged thereafter.

CITATION LIST

Patent Literature

Patent Literature 1: Japanese Patent Laid-Open No. 2006-033409
Patent Literature 2: Japanese Patent Laid-Open No. 09-284375

Non Patent Literature

Non-Patent Literature 1: "Denki Kagaku Impiidance Sokutei no Genri (in Japanese) (The principle of electrochemical impedance measurement)", [online], TOYO Corporation, [searched on Jun. 21, 2018], the Internet URL: https://www.toyo.co.jp/material/casestudy/detail/id=5498
Non-Patent Literature 2: "Koredake wa Shitteokitai Analogu Yougo (in Japanese) (Analog terms you need to know: remaining-battery-amount meter IC)", [online], EDN Japan (ITmedia Inc.), [searched on Jun. 21, 2018], the Internet <http://ednjapan.com/edn/articles/1303/05/news004.html>

SUMMARY

Technical Problem

Examples of secondary batteries in use include a secondary battery mounted on an instrument in advance and a secondary battery in a dry-cell battery shape. Such a secondary battery is directly usable in place of a typical dry-cell battery and replaceable. In this manner, the secondary battery has wide usage and high convenience, and thus has been significantly increasingly spreading.

However, the above-described conventional technologies assume that an instrument using a secondary battery has in advance a dedicated configuration for monitoring and displaying the state of the secondary battery. Thus, the user cannot figure out the remaining amount of a battery such as a dry-cell battery or a secondary battery in a dry-cell battery shape, which is used in an instrument having no dedicated configuration.

Embodiments of the present invention are intended to solve such a problem and provide a remaining-battery-amount management technology with which a user can easily figure out the remaining amount of a battery used in an existing instrument.

Means for Solving the Problem

To achieve the above-described intention, a remaining-battery-amount management system according to embodiments of the present invention includes: a plurality of terminals each mounted in advance on a battery of an instrument that is a management target and each configured to wirelessly transmit a battery state obtained by detecting an electric property related to a remaining battery amount of the battery and wirelessly transmit a terminal ID for identifying the terminal; and a management device configured to sequentially record a remaining amount index generated from each received battery state and indicating the remaining battery amount to a detection list in a storage unit in association with the terminal ID received together with the battery state and display, on a screen, instrument information of the instrument, which is registered in advance for each terminal ID in the detection list, together with the remaining amount index corresponding to the terminal ID.

In an exemplary configuration of the above-described remaining-battery-amount management system according to embodiments of the present invention, when a particular instruction is input through an operation or when a beacon signal is received from a beacon terminal installed at a predetermined place, the management device searches the detection list for a low-remaining-amount terminal, the remaining amount index of which is equal to or smaller than a threshold index set in advance, and gives notification in a visible, audible, or vibrating manner when the low-remaining-amount terminal is found.

In an exemplary configuration of the above-described remaining-battery-amount management system according to embodiments of the present invention, the plurality of terminals each detect the battery state of the battery when vibration is detected by a built-in first acceleration sensor and wirelessly transmit the battery state thus obtained and the terminal ID.

In an exemplary configuration of the above-described remaining-battery-amount management system according to embodiments of the present invention, the plurality of terminals each wirelessly transmit terminal-side vibration data in a duration in which the vibration is detected, and the management device generates management-side vibration data in a duration in which vibration is detected by a built-in second acceleration sensor, and when recording each terminal ID and the corresponding remaining amount index to the detection list, the management device compares a first detection duration in which vibration of the instrument is detected according to the terminal-side vibration data and a second detection duration in which vibration of the management device is detected according to the management-side vibration data, and determines whether recording to the detection list is permitted based on the length of an overlap duration in which the first and second detection durations overlap each other or the frequency of detection of the overlap duration.

In an exemplary configuration of the above-described remaining-battery-amount management system according to embodiments of the present invention, the management device records each terminal ID and the corresponding remaining amount index to the detection list only when the terminal ID and the corresponding battery state are received until a record permission duration of a certain length elapses since it is checked that the length of the overlap duration has reached a determination duration set in advance.

In an exemplary configuration of the above-described remaining-battery-amount management system according to embodiments of the present invention, the plurality of terminals each further include a use state determination circuit configured to compare the magnitude of the detected vibration to a threshold level set in advance and determine that the instrument is being used when the magnitude of the vibration exceeds the threshold level, and each wirelessly transmit the battery state and the terminal ID when it is determined by the use state determination circuit that the instrument is being used.

In an exemplary configuration of the above-described remaining-battery-amount management system according to embodiments of the present invention, the plurality of terminals each further include a use state determination circuit configured to compare the magnitude of vibration detected by a built-in first acceleration sensor to a threshold level set in advance and determine that the instrument is being used when the magnitude of the vibration exceeds the threshold level, and a switch provided in connection between at least any one of electrodes of the battery and a load circuit of the instrument, electrically connect the electrode and the load circuit by short-circuiting the switch only in a duration in which it is determined by the use state determination circuit that the instrument is being used, and detect the battery state of the battery in a duration in which it is determined that the instrument is not being used.

In an exemplary configuration of the above-described remaining-battery-amount management system according to embodiments of the present invention, when recording each terminal ID and the corresponding remaining amount index to the detection list, the management device checks a record allowed duration set in advance to the terminal ID and records the terminal ID and the remaining amount index to the detection list only when a recording time of the recording corresponds to the record allowed duration.

Another remaining-battery-amount management system according to embodiments of the present invention includes: a plurality of terminals each mounted in advance on a battery of an instrument that is a management target and each configured to detect, as a battery state, an electric property related to a remaining battery amount of the battery and wirelessly transmit the battery state thus obtained and a terminal ID for identifying the terminal; a higher-level device configured to sequentially record a remaining amount index generated from each battery state received from the corresponding one of the plurality of terminals and indicating the remaining battery amount to a detection list in a storage unit in association with the terminal ID received together with the battery state; and a management device configured to display remaining amount information related to the remaining battery amount on a screen based on the detection list acquired from the higher-level device through a communication line.

In an exemplary configuration of the above-described remaining-battery-amount management system according to embodiments of the present invention, a wireless relay device configured to accommodate the plurality of terminals and the management device through wireless lines and relay-connect the plurality of terminals and the management device to the higher-level device is further included, the wireless relay device measures a standard time synchronized with a time management server, and when relay-forwarding, to the higher-level device, the terminal ID wirelessly transmitted from each of the plurality of terminals, the wireless relay device notifies the higher-level device of the standard time at the relay-forwarding as a reception time of the terminal ID, and when recording each terminal ID and the corresponding remaining amount index, the higher-level device records the reception time of the terminal ID, notification of which is given by the wireless relay device, to the detection list in association with the terminal ID.

In an exemplary configuration of the above-described remaining-battery-amount management system according to embodiments of the present invention, the wireless relay device includes a parent device and a child device connected with each other through a wireless relay line, the child device accommodates the plurality of terminals or the management device and relay-connects the plurality of terminals or the management device to the parent device through the wireless line, and the parent device relay-connects, to the higher-level device, the plurality of terminals or the management device relay-connected through the child device, and when notifying the higher-level device of the reception times, the parent device corrects the reception times based on a delay time through the wireless relay line, which is obtained through measurement in advance, and then notifies the higher-level device of the corrected reception times.

A remaining-battery-amount management method according to embodiments of the present invention is used by a remaining-battery-amount management system in which, based on a battery state transmitted from each of a plurality of terminals each mounted in advance on a battery of an instrument that is a management target, a management device manages a remaining battery amount of the battery, and includes: a step in which the plurality of terminals each wirelessly transmit a battery state obtained by detecting an electric property related to the remaining battery amount of the battery and a terminal ID for identifying the terminal; and a step in which the management device sequentially records a remaining amount index generated from each received battery state and indicating the remaining battery amount to a detection list in a storage unit in association with the terminal ID received together with the battery state and displays, on a screen, instrument information of the instrument, which is registered in advance for each terminal ID in the detection list, together with the remaining amount index corresponding to the terminal ID.

Another remaining-battery-amount management method according to embodiments of the present invention is used by a remaining-battery-amount management system in which, based on a battery state transmitted from each of a plurality of terminals each mounted in advance on a battery of an instrument that is a management target, a higher-level device manages a remaining battery amount of the battery and provides information to a management device, and includes: a step in which the plurality of terminals each detect, as a battery state, an electric property related to the remaining battery amount of the battery and each wirelessly transmit the battery state thus obtained and a terminal ID for identifying the terminal; a step in which the higher-level device sequentially records a remaining amount index generated from each received battery state and indicating the remaining battery amount to a detection list in a storage unit in association with the terminal ID received together with the battery state; and a step in which the management device displays remaining amount information related to the battery remaining amount on a screen based on the detection list acquired from the higher-level device through a communication line.

Effects of Embodiments of the Invention

According to embodiments of the present invention, a battery state indicating an electric property related to the remaining battery amount of a battery is detected and wirelessly transmitted by a terminal, and remaining amount information related to the remaining amount of the battery is displayed on a screen based on the battery state received by a management device. Thus, when such a terminal is mounted on a battery of an existing-instrument having in advance no dedicated configuration for monitoring and displaying the state of the battery, a user can easily figure out the remaining amount of the battery used in the instrument.

BRIEF DESCRIPTION OF THE DRAWINGS

FIG. 1 is a block diagram illustrating the configuration of a remaining-battery-amount management system according to a first embodiment.

DETAILED DESCRIPTION OF ILLUSTRATIVE EMBODIMENTS

Figure 2A:
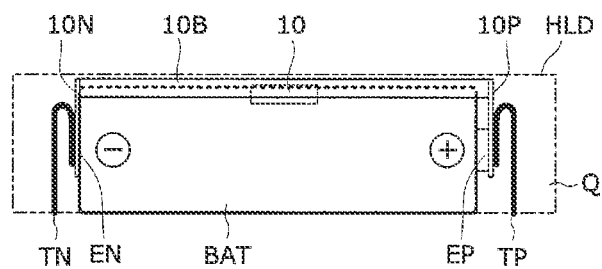
FIG. 2A is an explanatory diagram illustrating exemplary mounting (battery holder) of a terminal on a battery.

Embodiments of the present invention will be described below with reference to the accompanying drawings.

First Embodiment

First, a remaining-battery-amount management system 1 according to a first embodiment of the present invention will be described below with reference to FIG. 1. FIG. 1 is a block diagram illustrating the configuration of the remaining-battery-amount management system according to the first embodiment.

The remaining-battery-amount management system 1 includes a plurality of terminals 10 and a management device 20. Each terminal 10 is mounted in advance on a battery of an instrument that is a management target, detects, as a battery state, an electric property related to the remaining battery amount of a battery, and wirelessly transmits the battery state thus obtained and a terminal ID for identifying the terminal. The management device 20 displays, on a screen, remaining amount information related to the remaining amount of the battery based on the terminal ID and the battery state received from each terminal 10.

[Terminal]

The configuration of each terminal 10 will be first described below in detail with reference to FIG. 1.

Each terminal 10 is mainly achieved by a small-sized wireless terminal configured to perform wireless communication based on a short-distance wireless communication standard such as Bluetooth Low Energy (BLE; Bluetooth is a registered trademark), and is a wireless tag or an RFID tag as a specific example. As illustrated in FIG. 1, the terminal 10 includes, as main circuit units, a battery state detection circuit 11, an A/D converter 12, and a wireless circuit 13.

The battery state detection circuit 11 has a function to detect and output an electric property related to the remaining battery amount of a battery BAT that supplies power to a load circuit L of an instrument 5 on which the terminal 10 is mounted.

The A/D converter 12 has a function to perform A/D conversion of the electric property from the battery state detection circuit 11 into battery-state data representing a state related to the remaining amount of the battery BAT and output the battery-state data.

The wireless circuit 13 has a function to wirelessly transmit the battery-state data from the A/D converter 12, and a function to wirelessly transmit, when transmitting the battery-state data, a terminal ID set in advance to identify the terminal.

Typically, the remaining amount of a battery can be determined based on an electric property measured on the battery. For example, Non Patent Literature 1 discloses a voltage measurement scheme, a Coulomb counter scheme, a battery cell modeling scheme, and an impedance track scheme as major schemes for calculating the remaining battery amount. In addition, an IC chip configured to measure the remaining battery amount based on such a scheme is disclosed as well and may be used as the battery state detection circuit 11. Non Patent Literature 2 discloses the principle of measurement of electrochemical impedance used in the impedance track scheme, in particular.

Figure 2B:
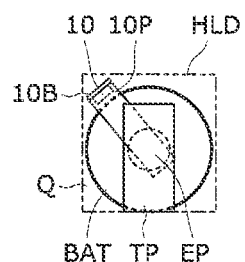
FIG. 2B is an explanatory diagram illustrating exemplary mounting (battery holder) of the terminal on the battery.

FIGS. 2A and 2B are explanatory diagrams illustrating exemplary mounting (battery holder) of a terminal on a battery: FIG. 2A is a side view and FIG. 2B is a front view. FIGS. 2A and 2B illustrate an example in which the terminal 10 is mounted on the battery BAT attached to a battery holder HLD of the instrument 5.

As illustrated in FIGS. 2A and 2B, the terminal 10 is made of a circuit unit in which a plurality of IC chips are mounted on a printed substrate and is attached to a terminal body 10B. The terminal body 10B is made of a rectangular plate member extending in the longitudinal direction of the battery BAT, in this example, an AA battery, and connection terminals 10P and 10N are connected with both ends of the terminal body 10B. The connection terminals 10P and 10N are provided to protrude in a direction orthogonal to the plane of the terminal body 10B toward a positive electrode EP and a negative electrode EN, respectively, of the battery BAT.

The terminal body 10B may be integrated with the printed substrate of the terminal 10, and connection wires for connecting the terminal 10 to the connection terminals 10P and 10N, and a wiring pattern such as an antenna for wireless communication of the terminal 10 may be formed on the surface of the terminal body 10B. The connection terminal 10P is made of a metal plate and inserted and sandwiched between the positive electrode EP of the battery BAT and a positive-side terminal TP of the battery holder HLD. Similarly, the connection terminal 10N is made of a metal plate and inserted and sandwiched between the negative electrode EN of the battery BAT and a negative-side terminal TN of the battery holder HLD. Since the connection terminals 10P and 10N are each sandwiched between the corresponding one of the electrodes of the battery BAT and the corresponding one of the terminals of the battery holder HLD, the terminal body 10B is supported in a space Q between the battery holder HLD having a cube shape and the battery BAT having a cylindrical shape, for example.

Figure 3A:
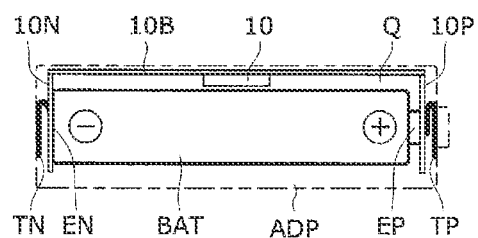
FIG. 3A is an explanatory diagram illustrating exemplary mounting (battery adapter) of the terminal on the battery.
Figures 3B, 4:
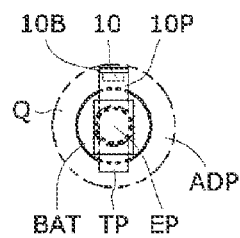
FIG. 3B is an explanatory diagram illustrating exemplary mounting (battery adapter) of the terminal on the battery.
FIG. 4 illustrates an exemplary configuration of a detection list.

FIGS. 3A and 3B are explanatory diagrams illustrating exemplary mounting (battery adapter) of a terminal on a battery: FIG. 3A is a side view and FIG. 3B is a front view. FIGS. 3A and 3B illustrate an example in which the terminal 10 is mounted on the battery BAT attached to what is called a battery adapter ADP that converts the size of the battery BAT that is an AAA battery into the size of an AA battery.

As illustrated in FIGS. 3A and 3B, the terminal 10 is made of a circuit unit in which a plurality of IC chips are mounted on a printed substrate and is attached to the terminal body 10B. The terminal body 10B is made of a rectangular plate member extending in the longitudinal direction of the battery BAT, in this example, an AA battery, and the connection terminals 10P and 10N are connected with both ends of the terminal body 10B. The connection terminals 10P and 10N are provided to protrude in a direction orthogonal to the plane of the terminal body 10B toward the positive electrode EP and the negative electrode EN, respectively, of the battery BAT.

The terminal body 10B may be integrated with the printed substrate of the terminal 10, and connection wires for connecting the terminal 10 to the connection terminals 10P and 10N, and a wiring pattern such as an antenna for wireless communication of the terminal 10 may be formed on the surface of the terminal body 10B. The connection terminal 10P is made of a metal plate and is inserted and sandwiched between the positive electrode EP of the battery BAT and the positive-side terminal TP of the battery adapter ADP. Similarly, the connection terminal 10N is made of a metal plate and is inserted and sandwiched between the negative electrode EN of the battery BAT and the negative-side terminal TN of the battery adapter ADP. Since the connection terminals 10P and 10N are each sandwiched between the corresponding one of the electrodes of the battery BAT and the corresponding one of the terminals of the battery adapter ADP, the terminal body 10B is supported in the space Q between the battery adapter ADP having a cylindrical shape and the battery BAT having a cylindrical shape, for example.

Accordingly, in any of the case of FIGS. 2A and 2B and the case of FIGS. 3A and 3B, the connection terminal 10P is electrically connected with the positive electrode EP and the positive-side terminal TP, and the connection terminal 10N is electrically connected with the negative electrode EN and the negative-side terminal TN. With this configuration, the terminal 10 detects an electric property of the battery BAT through the connection terminals 10P and 10N and wirelessly transmits the electric property together with the terminal ID.

Although FIGS. 2A and 2B or FIGS. 3A and 3B illustrate the example in which the battery BAT is an AA battery or an AAA battery, the battery size is not limited to these sizes, but embodiments of the present invention are also applicable to the battery BAT of another size. The shape of the battery holder HLD illustrated in FIGS. 2A and 2B and the shape of the battery adapter ADP illustrated in FIGS. 3A and 3B are merely exemplary, and embodiments of the present invention are not limited to these shapes but are also applicable to another shape, and the shape of the terminal body 10B may be changed accordingly.

[Management Device]

Subsequently, the management device 20 will be described below in detail with reference to FIG. 1.

The management device 20 is mainly achieved by an information processing terminal such as a smartphone, a tablet, or a cellular phone. As illustrated in FIG. 1, the management device 20 includes, as main functional components, a wireless I/F unit 21, an operation input unit 22, a display unit 23, a storage unit 24, a terminal recording unit 25, and a terminal management unit 26, which are connected with each other to perform data forwarding through an internal bus. Among these functional components, the terminal recording unit 25 and the terminal management unit 26 are achieved through cooperation of a CPU (not illustrated) with a program 24P in the storage unit 24.

The wireless I/F unit 21 has a function to perform wireless data communication with the terminals 10 based on a short-distance wireless communication standard such as BLE.

The operation input unit 22 is achieved by an operation input device such as a touch panel or an operation button and has a function to detect a user operation.

The display unit 23 includes a screen display device such as an LCD and has a function to perform screen display of various kinds of information such as a detection list to be described later.

The storage unit 24 is achieved by a storage device such as a semiconductor memory and has a function to store processing data used for remaining-battery-amount management processing at the management device 20 and the program 24P.

Main processing data stored in the storage unit 24 includes instrument information 24A and a detection list 24B.

The instrument information 24A is a name set for the terminal ID of each terminal 10 through an operation by a user in advance and indicating an instrument on which the terminal 10 is mounted.

The detection list 24B is a list to which information received from each terminal 10 and related to the battery BAT is recorded. FIG. 4 illustrates an exemplary configuration of the detection list. The list records each set of the terminal ID and the battery-state data wirelessly transmitted from the terminal 10, a remaining amount index generated from the battery-state data and indicating the remaining amount of the battery BAT, and a reception time at which these pieces of information are received. The remaining amount index is an index indicating the remaining amount of the battery BAT and may be a percentage or a stepped level value. In the example illustrated in FIG. 4, a remaining amount range between remaining amounts of 100% and 0% is divided into five steps, and the level values of 5, 4, 3, 2, and 1 are applied to the steps in the descending order of the remaining amount.

The program 24P is a program read from the storage unit 24 and executed by the CPU when the remaining-battery-amount management processing is performed at the management device 20. The program 24P is read from an external device or a recording medium (both not illustrated) connected with the management device 20 and is stored in the storage unit 24 in advance. The program 24P may be achieved by a software application executed on a smartphone or a tablet.

The terminal recording unit 25 has a function to sequentially record, in response to reception of the terminal ID and the battery-state data wirelessly transmitted from each terminal 10 by the wireless I/F unit 21, the terminal ID and the battery-state data, and a reception time at which these pieces of information are received to the detection list 24B in the storage unit 24. In addition, the terminal recording unit 25 has a function to generate, from the received battery-state data, the remaining amount index indicating the remaining amount of the battery BAT and record the remaining amount index to the detection list 24B.

The terminal management unit 26 has a function to display, in response to recording of each battery-state data or in response to a user's instruction operation detected by the operation input unit 22, the instrument information 24A and the remaining amount index corresponding to each terminal ID recorded in the detection list 24B on a screen at the display unit 23 together with the corresponding reception time. Each remaining amount index may not be recorded in the detection list 24B, but may be generated from the corresponding battery-state data in the detection list 24B and displayed on a screen when the terminal management unit 26 performs screen display.

Operation in First Embodiment

Figure 5:
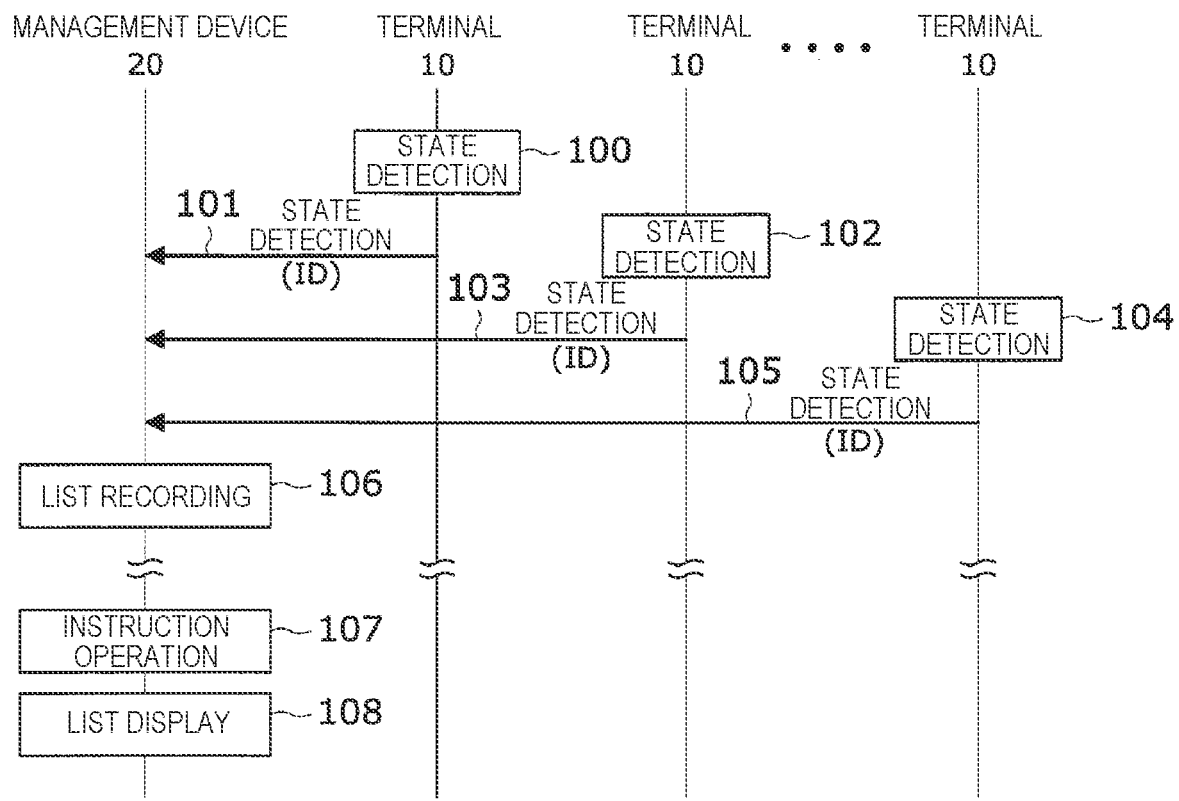
FIG. 5 is a sequence diagram illustrating a remaining-battery-amount management operation according to the first embodiment.

Subsequently, the operation of the remaining-battery-amount management system 1 according to the present embodiment will be described below with reference to FIG. 5. FIG. 5 is a sequence diagram illustrating a remaining-battery-amount management operation according to the first embodiment.

In each terminal 10, an electric property of the battery BAT is detected by the battery state detection circuit 1 (steps 100, 102, and 104), and battery-state data obtained through A/D conversion of the electric property at the A/D converter 12 and a terminal ID set in advance are wirelessly transmitted from the wireless circuit 13 (steps 101, 103, and 105). The electric property detection and the wireless transmission at the terminal 10 are executed, for example, at constant intervals.

In response to reception of the terminal ID and the battery-state data from each terminal 10 by the wireless I/F unit 21, the management device 20 records, to the detection list 24B, the terminal ID and the battery-state data, a remaining amount index generated from the battery-state data and indicating the remaining amount of the battery BAT, and a reception time at which these pieces of information are received (step 106).

Thereafter, in the management device 20, when a user's instruction operation is detected by the operation input unit 22 (step 107), the terminal management unit 26 displays, as a battery list on a screen at the display unit 23, the instrument information 24A and the remaining amount index corresponding to each terminal ID recorded in the detection list 24B together with the corresponding reception time (step 108).

Figure 6:
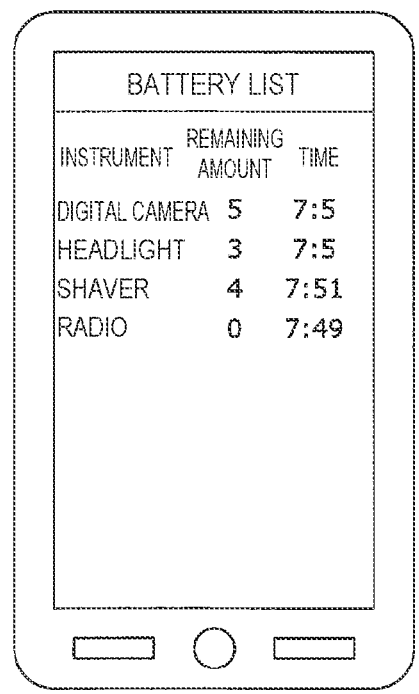
FIG. 6 illustrates an exemplary screen display of a battery list.

FIG. 6 illustrates exemplary screen display of the battery list. In this example, for each instrument name as the instrument information 24A corresponding to a terminal ID, the remaining amount index and the reception time are displayed as the battery list on a screen. Accordingly, the user can easily check the remaining battery amount of the battery BAT of each instrument 5.

The terminal management unit 26 may delete a terminal ID from the detection list 24B when a record expiration time set in advance has elapsed since recording of the terminal ID to the detection list 24B. Accordingly, a terminal ID recorded in the past is not displayed on a screen, which makes it easy for the user to recognize the detection list 24B displayed on the screen.

Effects of First Embodiment

Accordingly, in the present embodiment, each terminal 10 is mounted in advance on the battery BAT of the corresponding instrument 5 that is a management target, and wirelessly transmits a battery state obtained by detecting an electric property related to the remaining battery amount of the battery BAT, and a terminal ID for identifying the terminal. The management device 20 displays remaining amount information related to the remaining amount of the battery BAT on a screen based on the terminal ID and the battery state received from the terminal 10.

More specifically, the management device 20 sequentially records a remaining amount index generated from each received battery state and indicating the remaining amount of the battery BAT to the detection list 24B in the storage unit 24 in association with the terminal ID received together with the battery state. In addition, when displaying the remaining amount information of each terminal ID on a screen, the management device 20 displays the instrument information 24A of the instrument 5 registered to the terminal ID in advance on a screen together with the remaining amount index.

In this manner, the battery state indicating the electric property related to the remaining battery amount of the battery BAT is detected and wirelessly transmitted by each terminal 10, and the remaining amount information related to the remaining amount of the battery BAT is displayed on a screen based on the battery state received by the management device 20.

Thus, when such a terminal 10 is mounted on the battery BAT of an existing instrument 5 having in advance no dedicated configuration for monitoring and displaying the state of the battery BAT, a user can easily figure out the remaining amount of the battery BAT used in the instrument 5.

In the present embodiment, when recording a terminal ID and the corresponding remaining amount index to the detection list 24B, the terminal recording unit 25 may check a record allowed duration set in advance to the terminal ID and may record the terminal ID and the remaining amount index to the detection list 24B only when the recording time of the recording belongs to the record allowed duration.

Accordingly, the battery state and the remaining amount index related to any terminal 10 and required to be recorded to the detection list 24B in the management device 20 can be limited, for example, for each constant duration corresponding to a season.

Typically, the battery state of the battery BAT of each instrument 5, which is detected by the corresponding terminal 10, is sequentially wirelessly transmitted and recorded to the detection list 24B in the management device 20. Thus, when the user displays the remaining amount information thereof on a screen at the management device 20, the remaining amount index of the battery BAT of each terminal 10 recorded in the detection list 24B is displayed on the screen in a mess, which makes it difficult to easily check the remaining amount index of the battery BAT of a desired instrument 5.

In a case in which recording to the detection list 24B is limited to the record allowed duration as described above, the terminal ID, the battery-state data, and the remaining amount index of each terminal 10 are recorded to the detection list 24B as illustrated in FIG. 4 only when the recording time corresponds to the record allowed duration. For example, the duration of three months approximately, which corresponds to a season, may be set as the record allowed duration for each terminal 10 by the user in advance and stored in the storage unit 24. Each terminal ID and the like recorded in the detection list 24B are deleted when the record expiration time has elapsed as described above. Accordingly, the remaining amount index of the battery BAT of any frequently used instrument 5 is recorded in the detection list 24B for each season. This leads to reduction of the frequency of transition between registration and non-registration to the detection list 24B and allows the user to easily check the remaining amount index of the battery BAT of a desired instrument 5.

In the present embodiment, the terminal management unit 26 of the management device 20 may search for a low-remaining-amount terminal, and when the low-remaining-amount terminal is found, the display unit 23 may emit sound, light, or vibration in accordance with arrival of a notification time set by the user in advance, thereby notifying the user of forgetting to charge the instrument 5. The low-remaining-amount terminal is a terminal for which the remaining amount index of the battery BAT mounted on the instrument 5 is equal to or lower than a threshold index set in advance. The notification time set by the user in advance is, for example, the bedtime of the user. Accordingly, when the battery BAT is a secondary battery, the user can connect the instrument 5 to a charger and charge the instrument 5 in the night. Thus, it is possible to avoid a situation in which the user cannot use the instrument 5 the next day due to forgetting to charge although the instrument 5 needs to be used.

The notification timing of forgetting to charge may be the notification time set by the user in advance as well as a timing when the magnitude of a signal detected by an acceleration sensor included in the management device 20 has become small and it is presumed that the user has started sleeping. Accordingly, even when the user starts sleeping earlier than the notification time set in advance, the user can be notified of forgetting to charge, and thus it is possible to more reliably avoid a situation in which the user cannot use the instrument 5 due to forgetting to charge.

The notification of forgetting to charge may be given when the use frequency of the instrument 5 exceeds a predetermined threshold (for example, once in a week). Accordingly, the notification of forgetting to charge can be stopped and a user's unnecessary check operation can be omitted for the battery BAT of the instrument 5, the use frequency of which is low and that is not so important for the user, and thus a charge-forgetting notification function having high usability can be provided.

Second Embodiment

Figure 7:
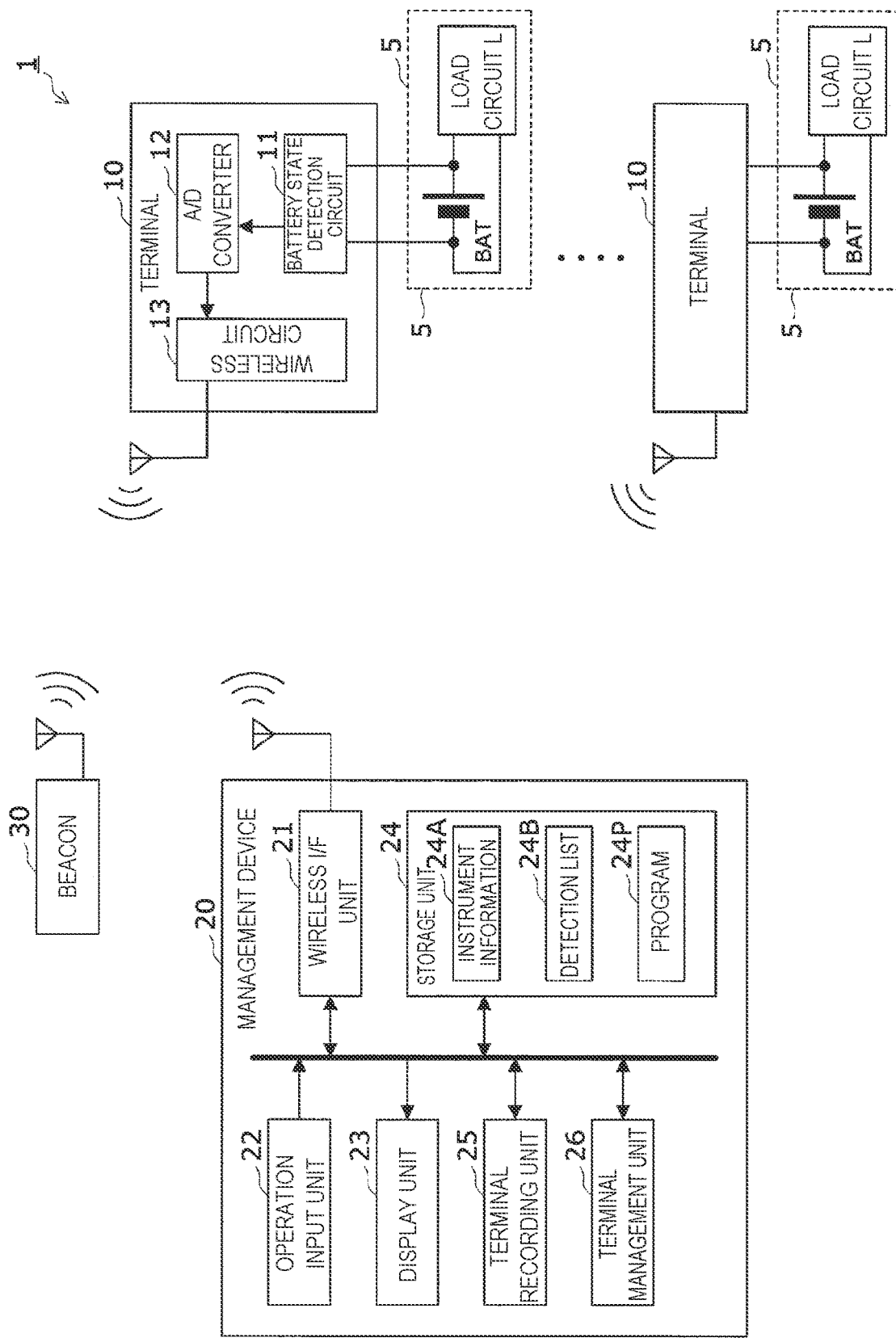
FIG. 7 is a block diagram illustrating the configuration of the remaining-battery-amount management system according to a second embodiment.

Subsequently, the remaining-battery-amount management system 1 according to a second embodiment of the present invention will be described below with reference to FIG. 7. FIG. 7 is a block diagram illustrating the configuration of the remaining-battery-amount management system according to the second embodiment.

The present embodiment describes a case in which remaining amount information is displayed on a screen in response to a beacon signal from a beacon terminal 30 installed at a predetermined place.

Specifically, in the present embodiment, the terminal management unit 26 of the management device 20 has two functions below. The first function is a function to search the detection list 24B for a low-remaining-amount terminal when a particular instruction is input through an operation or when a beacon signal is received from the beacon terminal 30 installed at a predetermined place. The low-remaining-amount terminal is a terminal, the remaining amount index of which is equal to or lower than a threshold index set in advance. The second function is a function to give notification of the decrease of the remaining amount in a visible, audible, or vibrating manner at the display unit 23 when a low-remaining-amount terminal is found.

The other configuration according to the present embodiment is the same as that in FIG. 1, and thus detailed description thereof will be omitted.

Operation in Second Embodiment

Figure 8:
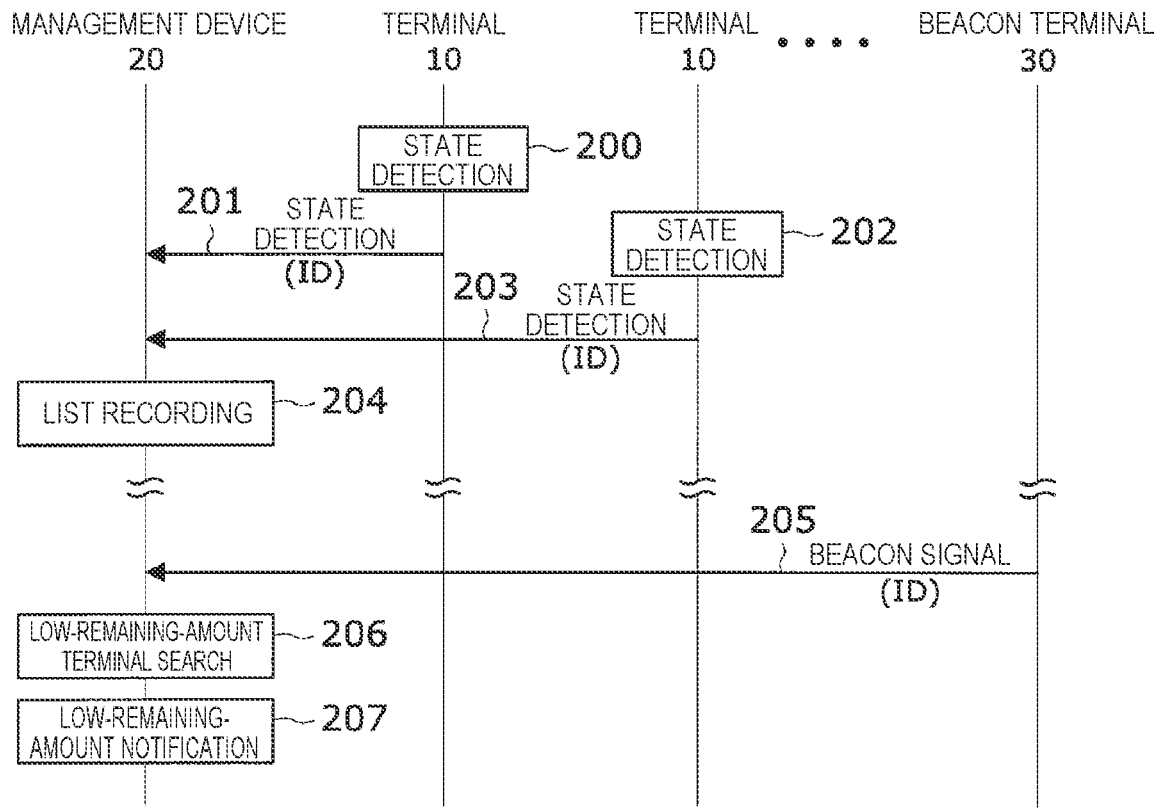
FIG. 8 is a sequence diagram illustrating the remaining-battery-amount management operation according to the second embodiment.

Subsequently, the operation of the remaining-battery-amount management system 1 according to the present embodiment will be described below with reference to FIG. 8. FIG. 8 is a sequence diagram illustrating the remaining-battery-amount management operation according to the second embodiment. The following description will be made on an example in which the beacon terminal 30 is installed at a gateway of a room.

In each terminal 10, an electric property of the battery BAT is detected by the battery state detection circuit 11 (steps 200 and 202), and battery-state data obtained through A/D conversion of the electric property at the A/D converter 12 and a terminal ID set in advance are wirelessly transmitted from the wireless circuit 13 (steps 201 and 203).

In response to reception of the terminal ID and the battery-state data from each terminal 10 by the wireless I/F unit 21, the management device 20 records, to the detection list 24B, the terminal ID and the battery-state data, a remaining amount index generated from the battery-state data and indicating the remaining amount of the battery BAT, and a reception time at which these pieces of information are received (step 204).

Thereafter, when the user has moved to the gateway, the wireless I/F unit 21 of the management device 20 receives a beacon signal from the beacon terminal 30 (step 205). In response, the terminal management unit 26 of the management device 20 searches the detection list 24B in the storage unit 24 for a low-remaining-amount terminal, the remaining amount index of which is equal to or lower than a threshold index set in advance (step 206). When a low-remaining-amount terminal is found, the display unit 23 gives notification of the decrease of the remaining amount in a visible, audible, or vibrating manner (step 207).

Accordingly, when the user has moved to a particular place such as a gateway, the detection list 24B is searched for a low-remaining-amount terminal, and notification of the decrease of the remaining amount of the battery BAT is automatically given in a visible, audible, or vibrating manner.

With this configuration, when departing, the user is notified of any instrument 5 having a low remaining battery amount and thus can take measures such as battery replacement to avoid in advance a situation in which the instrument 5 cannot be used due to battery shortage or forgetting to charge after the departure.

The present embodiment describes the example in which notification of decrease of the remaining amount of the battery BAT is given upon reception of a beacon signal from the beacon terminal 30 as a trigger, but the notification trigger is not limited to the beacon signal. For example, detection of a user's particular instruction operation by the operation input unit 22 may be used as a trigger for performing the search for a low-remaining-amount terminal and the notification of decrease of the remaining battery amount.

Effects of Second Embodiment

As described above, in the present embodiment, when a particular instruction is input through an operation or when a beacon signal is received from the beacon terminal 30 installed at a predetermined place, the management device 20 searches the detection list 24B for a low-remaining-amount terminal, the remaining amount index of which is equal to or lower than a threshold index set in advance. In addition, when a low-remaining-amount terminal is found, the display unit 23 of the management device 20 gives notification of the decrease of the remaining amount in a visible, audible, or vibrating manner.

Accordingly, for example, in a case in which the beacon terminal 30 is installed at a gateway of a room, the detection list 24B is searched for a low-remaining-amount terminal when the user has moved to a particular place such as the gateway, and notification of the decrease of the remaining amount of the battery BAT is automatically given in a visible, audible, or vibrating manner.

With this configuration, when departing, the user is notified of any instrument 5 having a low remaining battery amount and thus can take measures such as battery replacement to avoid in advance a situation in which the instrument 5 cannot be used due to battery shortage or forgetting to charge after the departure.

Third Embodiment

Figure 9:
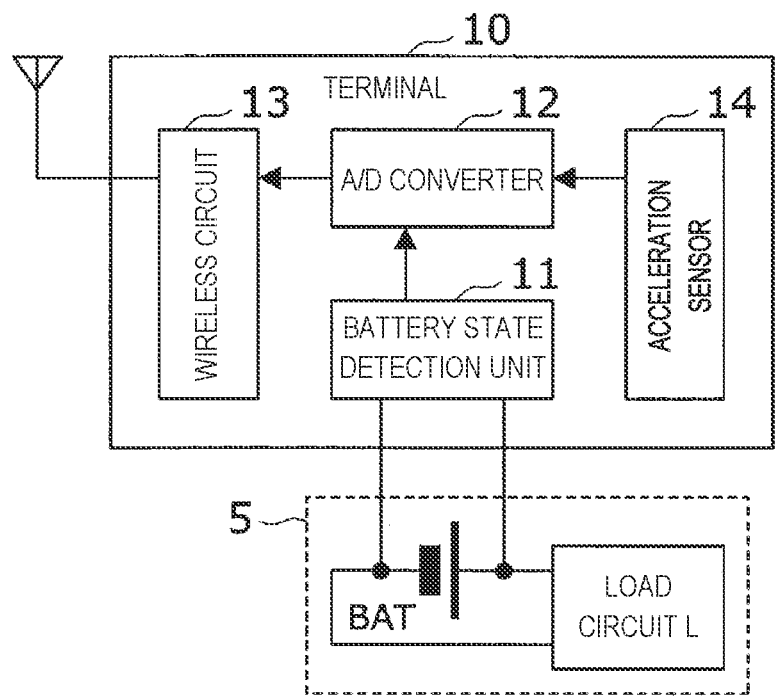
FIG. 9 is a block diagram illustrating the configuration of the terminal according to a third embodiment.

Subsequently, the remaining-battery-amount management system 1 according to a third embodiment of the present invention will be described below with reference to FIG. 9. FIG. 9 is a block diagram illustrating the configuration of a terminal according to the third embodiment.

The present embodiment describes a case in which an acceleration sensor (first acceleration sensor) 14 is provided to each terminal 10 and the battery state of the battery BAT is detected and wirelessly transmitted when vibration is detected by the acceleration sensor 14.

Specifically, in the present embodiment, the wireless circuit 13 of the terminal 10 has a function to detect the battery state of the battery BAT when vibration is detected by the built-in acceleration sensor 14 and to wirelessly transmit the obtained battery state and the terminal ID.

The A/D converter 12 has a function to perform A/D conversion of an electric property from the battery state detection circuit 11 into battery-state data and output the battery-state data, and a function to perform A/D conversion of an acceleration signal output from the acceleration sensor 14 upon detection into acceleration data and to output the acceleration data.

The other configuration according to the present embodiment is the same as that in FIG. 1, and thus detailed description thereof will be omitted.

The battery BAT of the instrument 5 is consumed when the instrument 5 is operated by a user. Whenever the instrument 5 is operated by the user, vibration is generated and detected by the acceleration sensor 14. Thus, the battery state is detected and wirelessly transmitted at the timing at which the instrument 5 is operated by the user, but detection and wireless transmission of the battery state are stopped when the instrument 5 is not operated by the user, in other words, when the battery BAT of the instrument 5 is not consumed.

Accordingly, power consumption at the terminal 10 can be reduced as compared to a case in which the terminal 10 performs detection and wireless transmission of the battery state at constant intervals.

Fourth Embodiment

Figure 10:
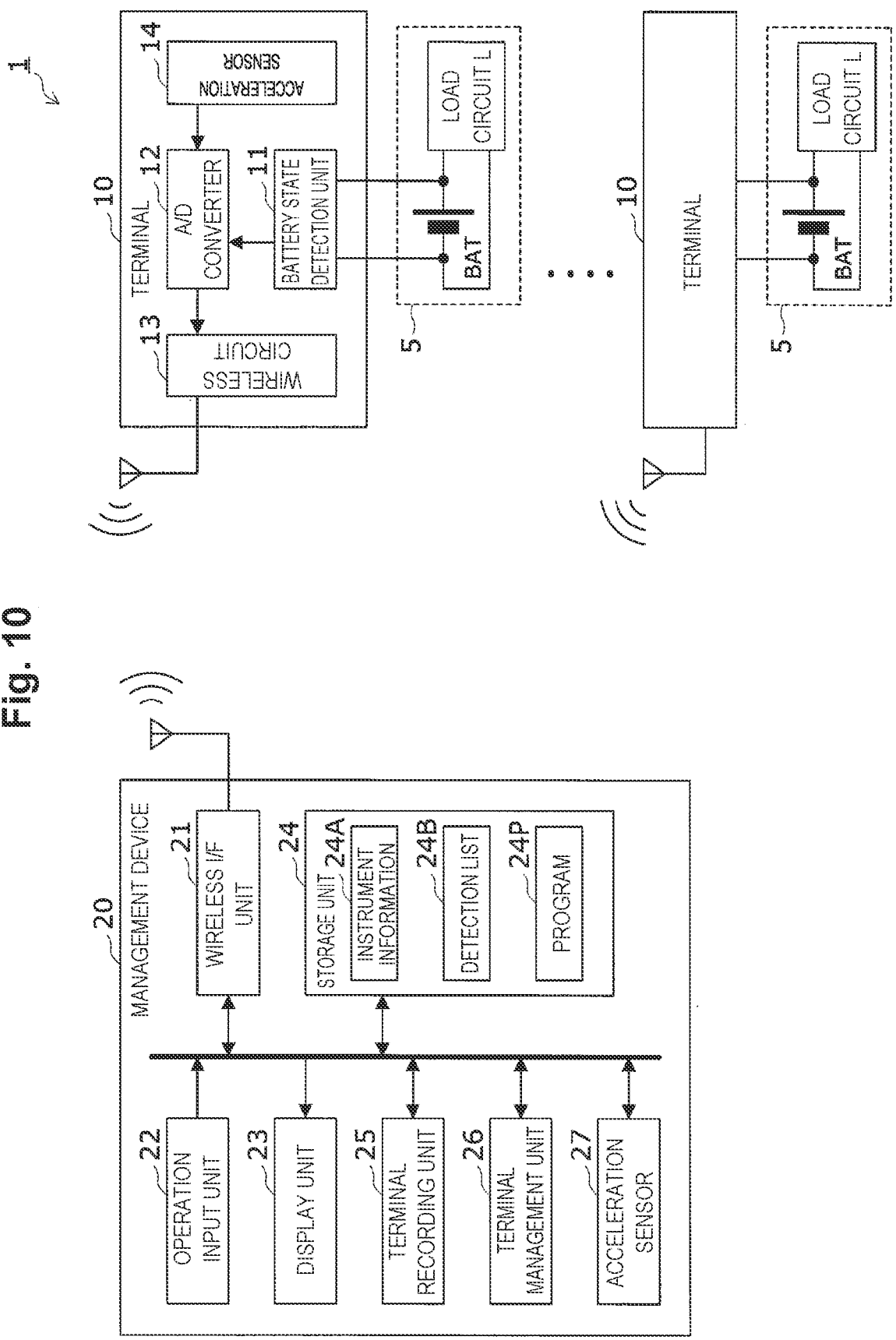
FIG. 10 is a block diagram illustrating the configuration of the remaining-battery-amount management system according to a fourth embodiment.

Subsequently, the remaining-battery-amount management system 1 according to a fourth embodiment of the present invention will be described below with reference to FIG. 10. FIG. 10 is a block diagram illustrating the configuration of the remaining-battery-amount management system according to the fourth embodiment.

The present embodiment describes a case in which the acceleration sensor (first acceleration sensor) 14 is provided to each terminal 10, an acceleration sensor (second acceleration sensor) 27 is provided to the management device 20, and the battery state transmitted from the terminal 10 is received and recorded when vibration is simultaneously detected at the terminal 10 and the management device 20.

Specifically, in the present embodiment, the terminal 10 has a function to wirelessly transmit terminal-side vibration data in a duration in which vibration is detected by the built-in acceleration sensor (first acceleration sensor) 14.

The management device 20 has two functions below. The first function is a function to generate management-side vibration data in a duration in which vibration is detected by the built-in acceleration sensor (second acceleration sensor) 27. The second function is a function to compare a first detection duration and a second detection duration when recording a terminal ID and the corresponding remaining amount index received from the corresponding terminal 10 to the detection list 24B and determine whether recording to the detection list 24B is permitted based on the length of an overlap duration in which the first and second detection durations overlap each other or the frequency of detection of the overlap duration. The first detection duration is a duration in which vibration of the instrument 5 is detected according to the terminal-side vibration data. The second detection duration is a duration in which vibration of the management device 20 is detected according to the management-side vibration data.

The other configuration according to the present embodiment is the same as that in FIG. 1, and thus detailed description thereof will be omitted.

Operation in Fourth Embodiment

Figure 11:
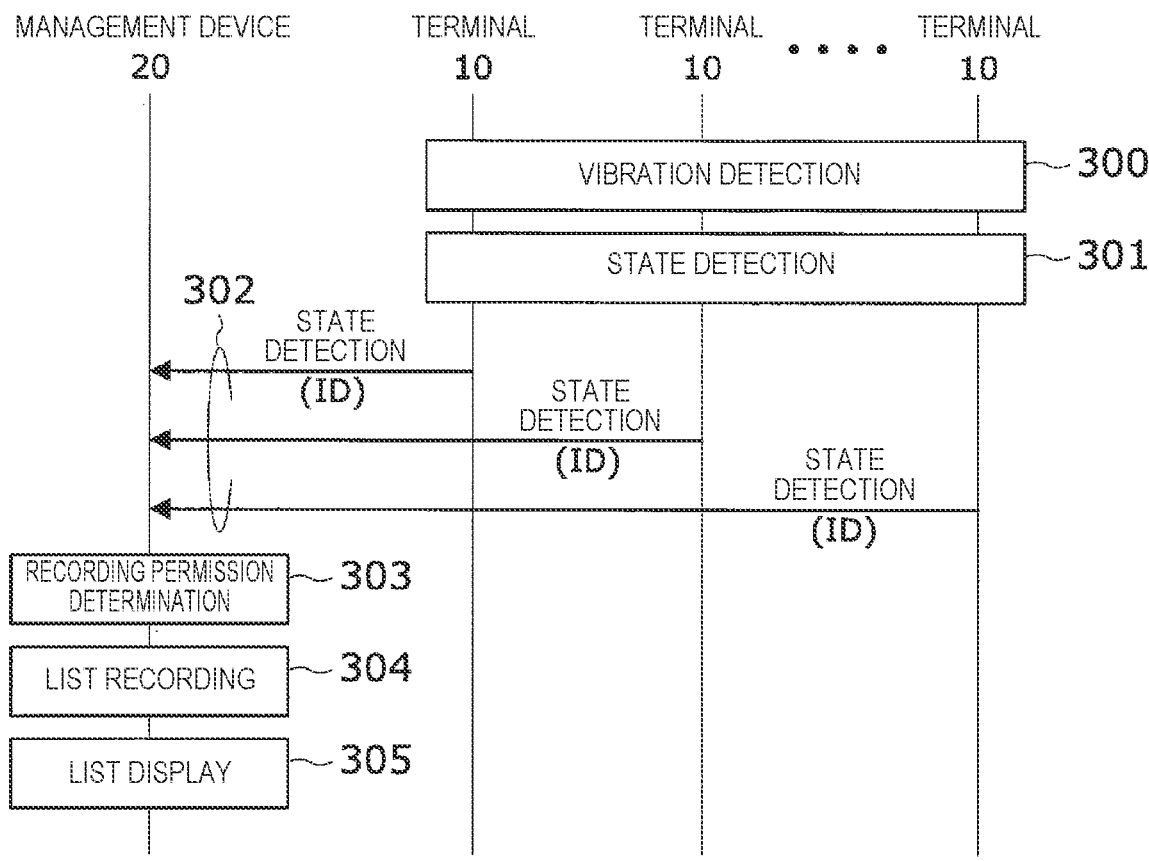
FIG. 11 is a sequence diagram illustrating the remaining-battery-amount management operation according to the fourth embodiment.

Subsequently, the operation of the remaining-battery-amount management system 1 according to the present embodiment will be described below with reference to FIG. 11. FIG. 11 is a sequence diagram illustrating the remaining-battery-amount management operation according to the fourth embodiment. The following description will be made on an example in which, when a user having a bag in which a plurality of instruments 5 are stored departs, the remaining amount of the battery BAT of each instrument 5 is checked on a smartphone of a user. Assume that a terminal 10 is mounted on the battery BAT of each instrument 5 in advance, and an application configured to achieve functions of the management device 20 is installed on the smartphone.

When the user lifts the bag in which the plurality of instruments 5 are stored, vibration is detected by the acceleration sensor 14 of each terminal 10 (step 300), the battery state of each battery BAT is detected (step 301), and terminal-side vibration data representing the vibration detection, the battery states, and the terminal IDs are wirelessly transmitted at once from the wireless circuits 13 of the terminals 10 (step 302).

In response to reception of the terminal-side vibration data from each terminal 10 by the wireless I/F unit 21, the terminal recording unit 25 of the management device 20 determines whether recording is permitted based on the duration of overlap with management-side vibration data detected by the acceleration sensor 27 (step 303). When having determined that the recording is permitted based on the length of the overlap duration or the frequency of detection thereof, the terminal recording unit 25 sequentially records the terminal IDs and the battery states received together with the terminal-side vibration data to the detection list 24B (step 304).

The terminal management unit 26 displays remaining amount information related to the battery BAT of each instrument 5 on a screen at the display unit 23 based on the detection list 24B (step 305).

Figure 12:
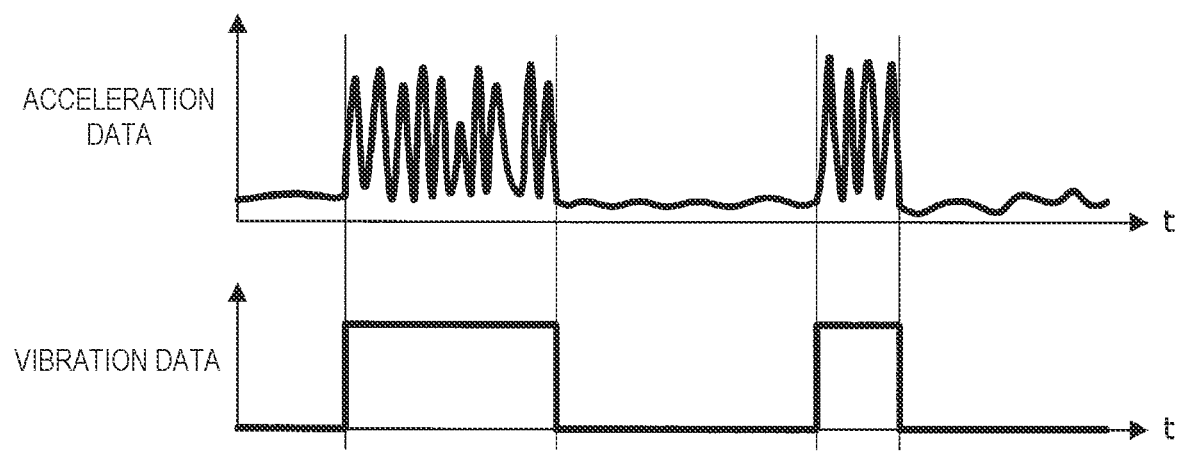
FIG. 12 is a signal waveform diagram illustrating the relation between acceleration data and vibration data.

FIG. 12 is a signal waveform diagram illustrating the relation between acceleration data and vibration data. As illustrated in FIG. 12, the amplitude of the acceleration data (acceleration signal) largely changes with the strength of vibration. Thus, stable vibration data can be obtained by performing threshold processing at the wireless circuit 13 and the terminal recording unit 25. In the threshold processing, for example, comparison with high and low thresholds may be performed and both obtained outputs may be subjected to exclusive OR processing to generate vibration data. The threshold processing of the acceleration data of each terminal 10 may be performed at the terminal recording unit 25, which can lead to reduction of the number of circuit components and electric power consumption at the terminal 10.

Figure 13:
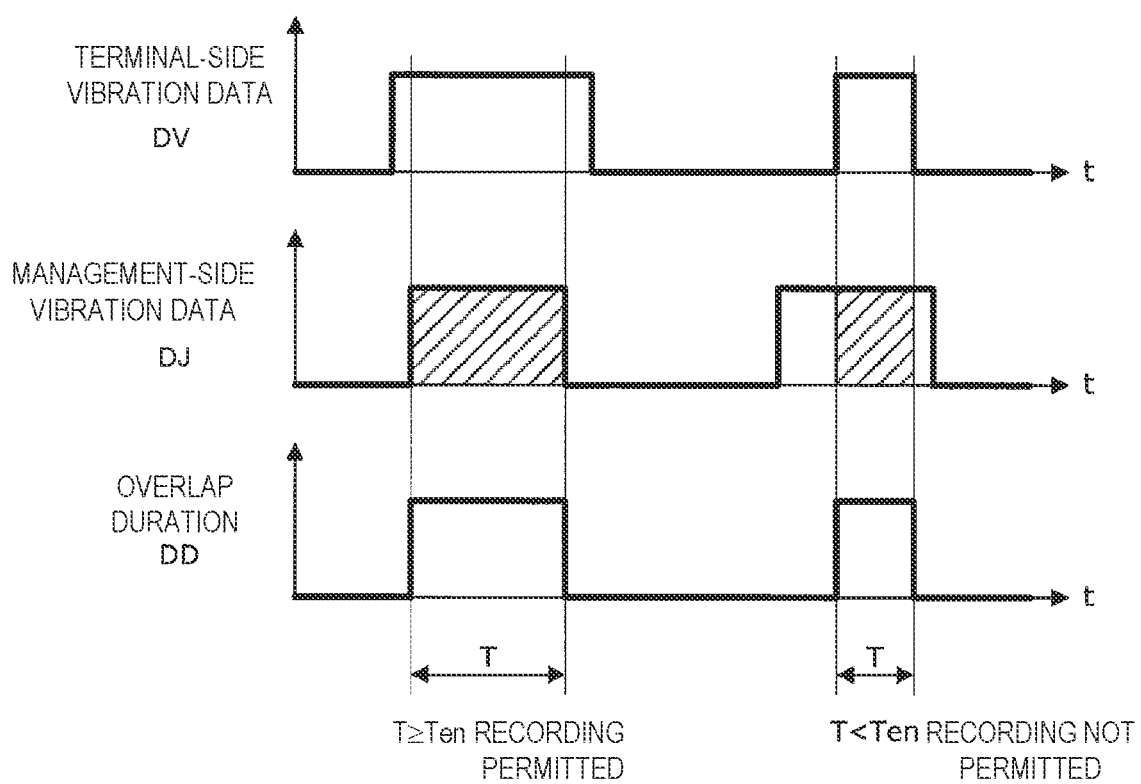
FIG. 13 is a signal waveform diagram illustrating a comparative example of terminal-side vibration data and management-side vibration data.

FIG. 13 is a signal waveform diagram illustrating an exemplary comparison of terminal-side vibration data and management-side vibration data. As illustrated in FIG. 13, the terminal recording unit 25 performs logic product processing of terminal-side vibration data DV and management-side vibration data DJ to specify an overlap duration DD in which the first and second detection durations overlap each other. It is determined that terminal ID recording to the detection list 24B is permitted when a time length T of the obtained overlap duration DD of continuous detection is equal to or longer than a determination duration Ten, or it is determined that terminal ID recording to the detection list 24B is not permitted when the time length T of the overlap duration DD is shorter than the determination duration Ten.

According to the present embodiment, when the management device 20 does not vibrate simultaneously with a terminal 10, the terminal ID of the terminal 10 is not recorded to the detection list 24B. As a result, the frequency of terminal ID recording to the detection list 24B is reduced, and the number of recorded terminal IDs is reduced. Accordingly, the user can check, on a screen, only any terminal 10 vibrating simultaneously with a smartphone as the management device 20, in other words, the remaining amount of the battery BAT of the corresponding instrument 5, and thus can easily recognize the remaining battery amount.

Figure 14:
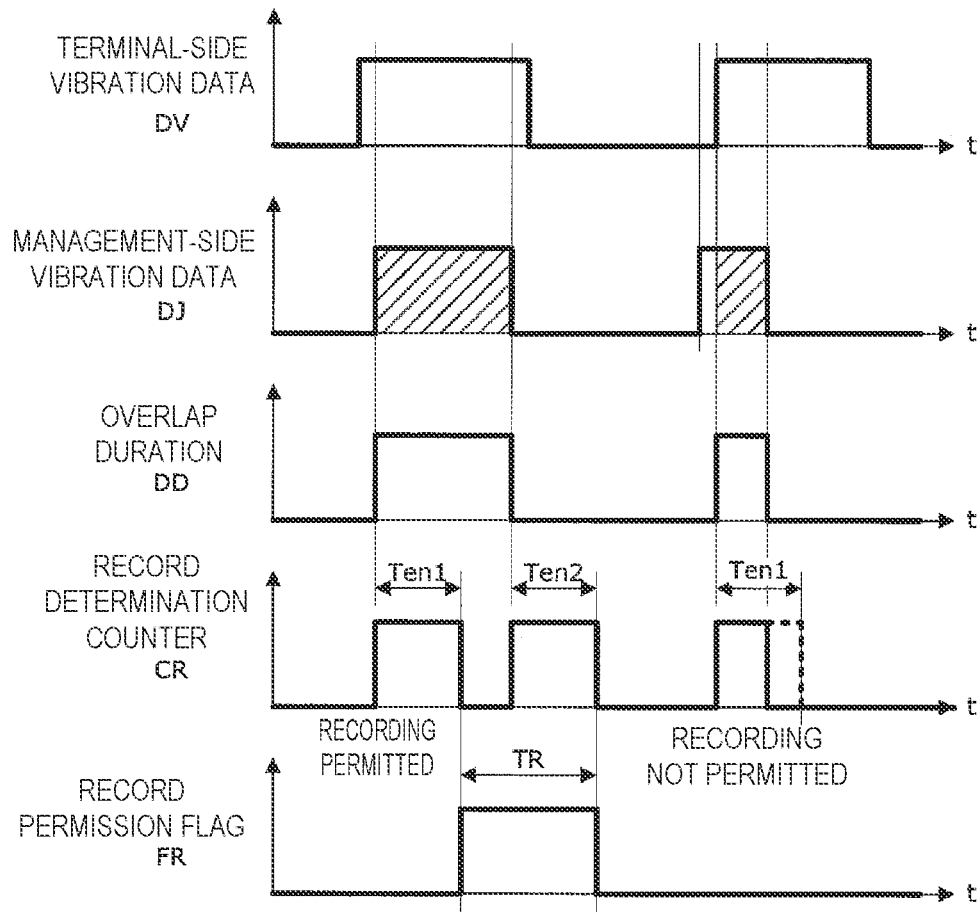
FIG. 14 is a signal waveform diagram illustrating a comparative example (counter) of the terminal-side vibration data and management-side vibration data.

The time length T of the overlap duration DD may be determined by using a counter. FIG. 14 is a signal waveform diagram illustrating an exemplary comparison (counter) of the terminal-side vibration data and the management-side vibration data. As illustrated in FIG. 14, a determination duration Ten1 may be measured by using a record determination counter CR configured to operate with a clock signal at a constant frequency. The terminal recording unit 25 activates the record determination counter CR in accordance with the start timing of the overlap duration DD, and determines that terminal ID recording is permitted when the overlap duration DD is continuously detected for a length equal to or longer than the determination duration Ten1 as the record determination counter CR counts up, or determines that terminal ID recording is not permitted when the overlap duration DD is shorter than the determination duration Ten1.

A record permission flag FR indicating whether terminal ID recording to the detection list 24B is permitted may be provided, and whether recording of a received terminal ID is permitted may be checked based on whether the record permission flag FR is in an "on" state indicating that the recording is permitted. In this case, the terminal recording unit 25 measures a determination duration Ten2 by the record determination counter CR. Then, when it is determined that terminal ID recording is permitted as described above, the terminal recording unit 25 sets the record permission flag FR to the "on" state, starts count operation by the record determination counter CR at the end timing of the overlap duration DD, and sets the record permission flag FR to an "off" state when elapse of the determination duration Ten2 is checked as the record determination counter CR counts up.

Accordingly, a record permission duration TR is a duration until the determination duration Ten2 of a certain length elapses since it is checked that the overlap duration DD is continuously detected for a length equal to or longer than the determination duration Ten1. Thus, only when a terminal ID is received simultaneously with the overlap duration DD, the terminal ID is recorded to the detection list 24B, which achieves more stable terminal ID record processing.

Although the above description is made on a case in which permission of terminal ID recording is determined based on the length of the overlap duration DD of the terminal-side vibration data DV and the management-side vibration data DJ, permission of terminal ID recording may be determined based on a detection frequency DN of the overlap duration DD in a constant detection time.

In this case, a determination frequency DNth may be set in advance, the detection frequency DN may be counted based on the start timing of the overlap duration DD, and it may be determined that terminal ID recording is permitted when the detection frequency DN becomes equal to or higher than the determination frequency DNth.

Accordingly, the terminal ID of a terminal 10 is recorded to the detection list 24B only after, for example, vibration is detected three times (DNth=3) simultaneously with the management device 20. Thus, the frequency of terminal ID recording to the detection list 24B is reduced, and the number of recorded terminal IDs is reduced. Accordingly, the user can easily recognize the detection list 24B displayed on a screen.

Effects of Fourth Embodiment

As described above, in the present embodiment, each terminal 10 wirelessly transmits terminal-side vibration data in a duration in which vibration is detected by the acceleration sensor 14. The management device 20 generates management-side vibration data in a duration in which vibration is detected by the built-in acceleration sensor 27. When recording the terminal ID and the remaining amount index received from the terminal 10 to the detection list 24B, the management device 20 compares the first detection duration and the second detection duration and determines whether recording to the detection list 24B is permitted based on the length of an overlap duration in which the first and second detection durations overlap each other or the frequency of detection of the overlap duration. The first detection duration is a duration in which vibration of the instrument 5 is detected according to the terminal-side vibration data. The second detection duration is a duration in which vibration of the management device 20 is detected according to the management-side vibration data.

Accordingly, when the management device 20 does not vibrate simultaneously with the terminal 10, the terminal ID of the terminal 10 is not recorded to the detection list 24B. As a result, the frequency of terminal ID recording to the detection list 24B is reduced, and the number of recorded terminal IDs is reduced. Accordingly, the user can check, on a screen, only any terminal 10 vibrating simultaneously with a smartphone as the management device 20, in other words, the remaining amount of the battery BAT of the corresponding instrument 5, and thus can easily recognize the remaining battery amount.

Fifth Embodiment

Figure 15:
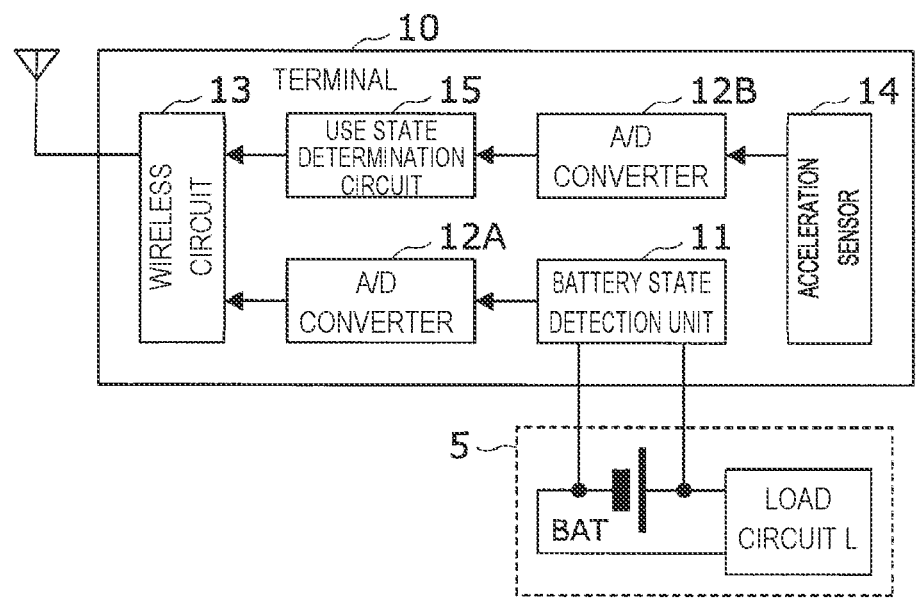
FIG. 15 is a block diagram illustrating the configuration of the terminal according to a fifth embodiment.

Subsequently, the remaining-battery-amount management system 1 according to a fifth embodiment of the present invention will be described below with reference to FIG. 15. FIG. 15 is a block diagram illustrating the configuration of a terminal according to the fifth embodiment.

The present embodiment describes a case in which a use state determination circuit 15 is provided to the terminal 10 in FIG. 9 and the battery state of the battery BAT is detected and wirelessly transmitted only when it is determined based on vibration detected by the acceleration sensor 14 that the instrument 5 is being used.

Specifically, in the present embodiment, each terminal 10 further includes the use state determination circuit 15, and the wireless circuit 13 has a function to wirelessly transmit the battery state and the terminal ID thereof when it is determined by the use state determination circuit 15 that the instrument 5 is being used. The use state determination circuit 15 is a circuit configured to compare the magnitude of vibration detected by the acceleration sensor 14 to a threshold level set in advance and determine that the instrument 5 is being used when the magnitude of the vibration exceeds the threshold level.

In the exemplary configuration illustrated in FIG. 15, the A/D converter 12 in FIG. 9 is separated into two of an A/D converter 12A and an A/D converter 12B. The A/D converter 12A has a function to perform A/D conversion of an electric property from the battery state detection circuit 11 into battery-state data representing a state related to the remaining amount of the battery BAT and to output the battery-state data to the wireless circuit 13. The A/D converter 12B has a function to perform A/D conversion of an acceleration signal output from the acceleration sensor 14 upon detection into acceleration data and to output the acceleration data to the use state determination circuit 15.

According to the present embodiment, when it is determined by the use state determination circuit 15 that the instrument 5 is being used, the battery state detected by the battery state detection circuit 11 and the terminal ID are wirelessly transmitted from the wireless circuit 13. Thus, the battery state is detected and wirelessly transmitted at the timing at which the instrument 5 is operated by a user, and detection and wireless transmission of the battery state are stopped when the instrument 5 is not operated by the user, in other words, when the battery BAT of the instrument 5 is not consumed. Moreover, it is not determined that the instrument 5 is being used when vibration is relatively small, for example, when the instrument 5 is wrongly touched by the user. Accordingly, power consumption at the terminal 10 can be reduced more efficiently than in the third embodiment.

Sixth Embodiment

Figure 16:
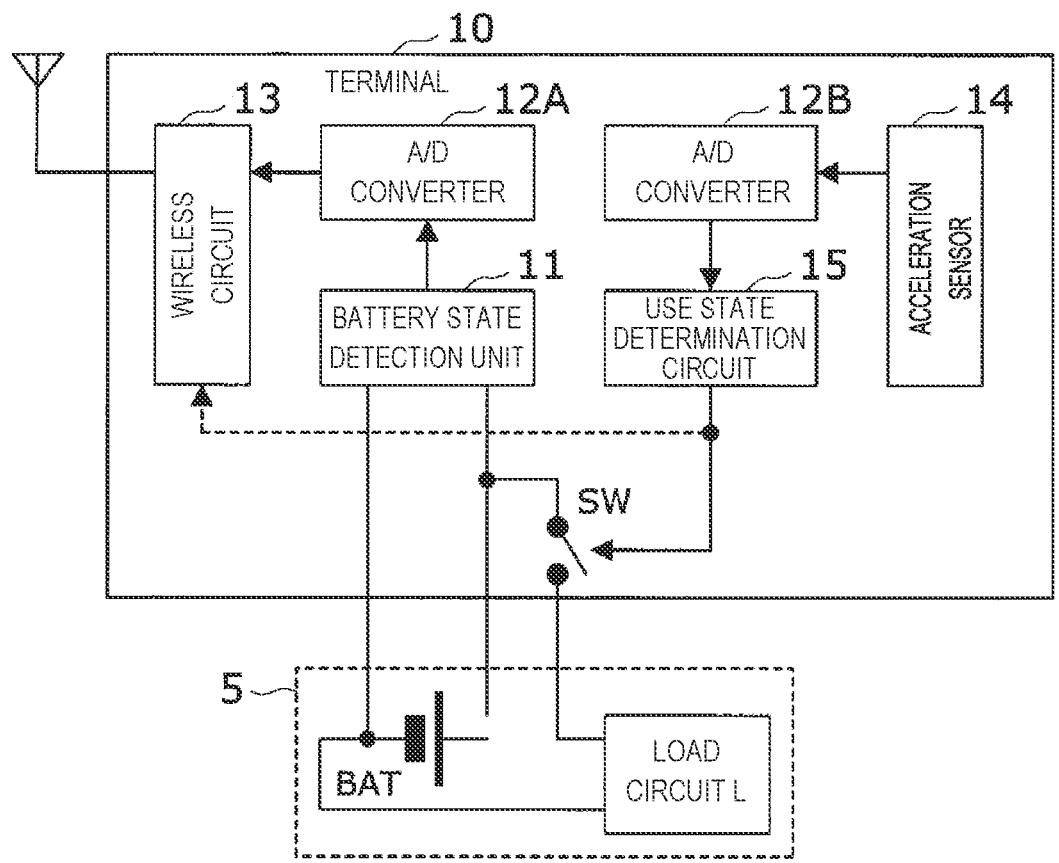
FIG. 16 is a block diagram illustrating the configuration of the remaining-battery-amount management system according to a sixth embodiment.

Subsequently, the remaining-battery-amount management system 1 according to a sixth embodiment of the present invention will be described below with reference to FIG. 16. FIG. 16 is a block diagram illustrating the configuration of the remaining-battery-amount management system according to the sixth embodiment.

The present embodiment describes a case in which each terminal 10 includes a switch SW between the battery BAT and the load circuit L of the instrument 5 and power supply from the battery BAT to the load circuit L of the instrument 5 is controlled through on-off control of the switch SW in accordance with a result of determination by the use state determination circuit 15.

Specifically, in the present embodiment, each terminal 10 further includes the use state determination circuit 15 and the switch SW. The use state determination circuit 15 is a circuit configured to compare the magnitude of vibration detected by the acceleration sensor 14 to a threshold level set in advance and determine that the instrument 5 is being used when the magnitude of the vibration exceeds the threshold level. The switch SW is a switch provided in connection between at least any one of electrodes of the battery BAT and the load circuit L of the instrument 5. In the present embodiment, the terminal 10 has a function to electrically connect the battery BAT and the load circuit L by short-circuiting the switch SW only when it is determined by the use state determination circuit 15 that the instrument 5 is being used and to detect the battery state of the battery BAT in a duration in which it is determined that the instrument 5 is not being used.

Figure 17:
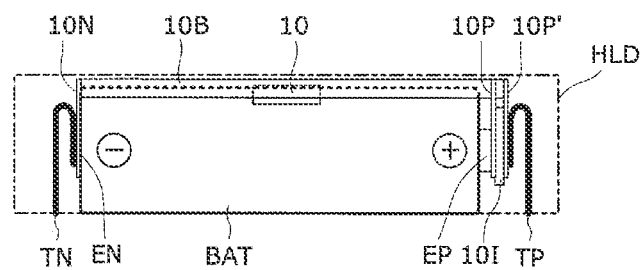
FIG. 17 is an explanatory diagram illustrating exemplary insulation (battery holder) between the battery and a load circuit.

FIG. 17 is an explanatory diagram illustrating exemplary insulation (battery holder) between the battery and the load circuit. When the switch SW is provided, each electrode of the battery BAT and the load circuit L of the instrument 5 needs to be insulated from each other.

In the example illustrated in FIG. 17, an insulation plate 10I such as a plastic plate is disposed between the positive electrode EP of the battery BAT and the positive-side terminal TP of the battery holder HLD. In this case, the connection terminal 10P, the insulation plate 10I, and a connection terminal 10P' are connected to an end part of the terminal body 10B and sandwiched between the positive electrode EP and the positive-side terminal TP so that the connection terminal 10P, the insulation plate 10I, and the connection terminal 10P' are disposed in the stated order from the positive electrode EP side.

Accordingly, the positive electrode EP is connected with the connection terminal 10P, the positive-side terminal TP is connected with the connection terminal 10P', and the connection terminal 10P and the connection terminal 10P' are electrically insulated from each other through the insulation plate 10I. Accordingly, power supply to the load circuit L can be controlled through the switch SW by connecting the connection terminal 10P and the connection terminal 10P' to the switch SW of the terminal 10 through connection wires. The switch SW may be, for example, a semiconductor switching element such as a MOSFET or a photo MOS relay that have an increased channel width to reduce on-resistance between the source and the drain, or a mechanical switching circuit such as a relay.

With this configuration, when the user holds the instrument 5 with a hand to use the instrument 5, vibration of the instrument 5 is detected by the acceleration sensor 14 of the terminal 10. When the vibration exceeds a threshold level, it is determined by the use state determination circuit 15 that the instrument 5 is being used, and the switch SW is short-circuited to supply power source from the battery BAT to the load circuit L of the instrument 5. When vibration detected by the acceleration sensor 14 is lower than the threshold level after the use of the instrument 5 is ended, it is determined by the use state determination circuit 15 that the instrument 5 is not being used, and the switch SW is opened to stop power supply from the battery BAT to the load circuit L of the instrument 5. In the stopping of power supply, the switch SW may be opened when a certain time has elapsed since it is determined that the instrument 5 is not being used, which can ensure stable operation of the instrument 5.

Typically, in detection of an electric property related to the remaining battery amount of a battery, the electric property can be detected more accurately when the battery is connected with no load. According to the present embodiment, the battery BAT and the load circuit L of the instrument 5 are separated from each other when the instrument 5 is not being used, and thus the electric property related to the remaining battery amount can be accurately detected when the instrument 5 is not being used. In addition, current to the load circuit L is cut off when the instrument 5 is not being used, which can result in an increased lifetime of the battery BAT.

In the present embodiment, a result of determination at the use state determination circuit 15 may be output to the wireless circuit 13 (refer to the dashed-line arrow in FIG. 16), and when it is determined by the use state determination circuit 15 that the instrument 5 is being used, an electric property detected by the battery state detection circuit 11 may be wirelessly transmitted as the battery state from the wireless circuit 13. Accordingly, the battery state can be wirelessly transmitted only when the instrument 5 is not being used, and thus remaining amount information related to the remaining amount of the battery BAT can be more accurately presented to the user.

Seventh Embodiment

Figure 18:
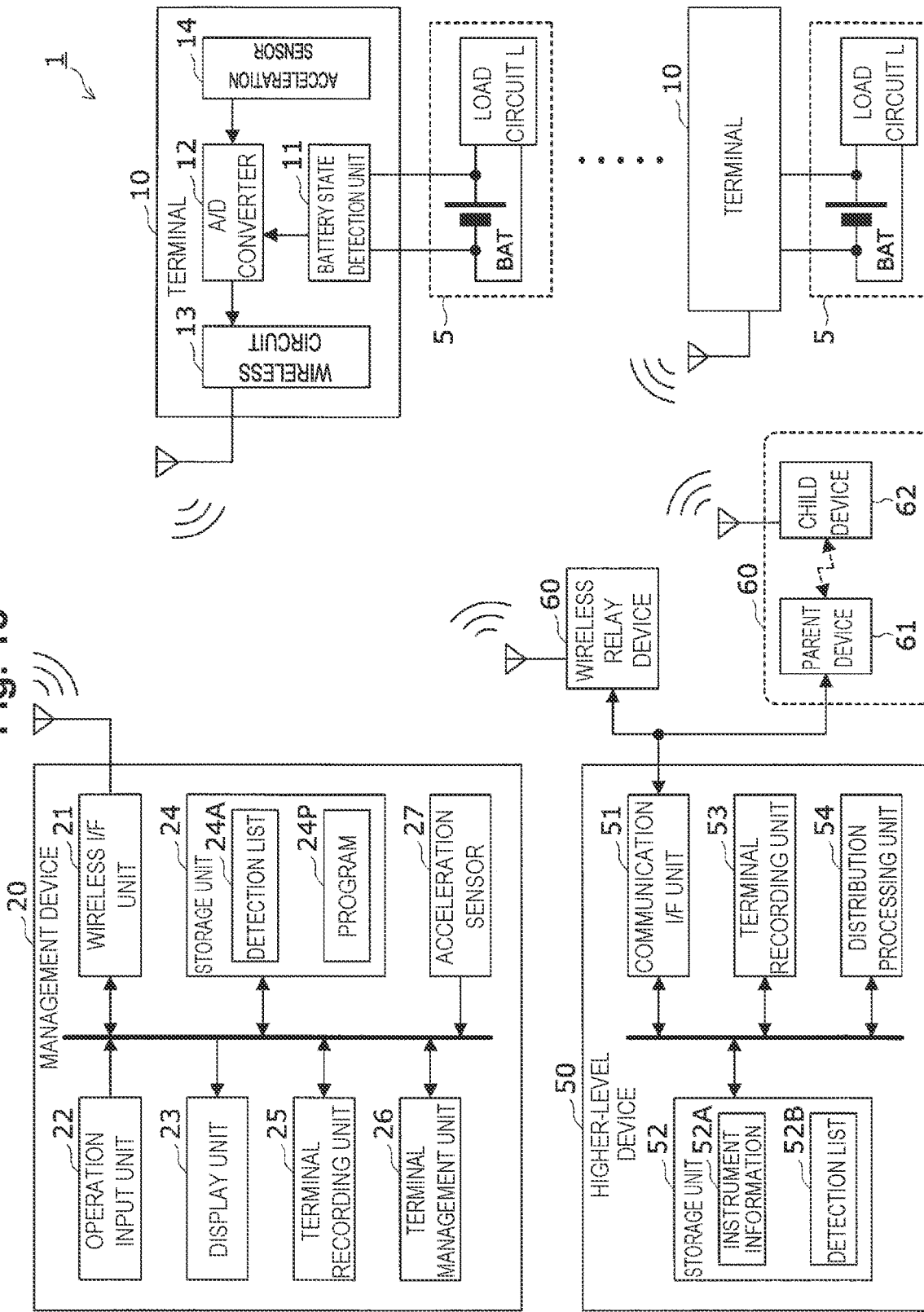
FIG. 18 is a block diagram illustrating the configuration of the remaining-battery-amount management system according to a seventh embodiment.

Subsequently, the remaining-battery-amount management system 1 according to a seventh embodiment of the present invention will be described below with reference to FIG. 18. FIG. 18 is a block diagram illustrating the configuration of the remaining-battery-amount management system according to the seventh embodiment.

In the present embodiment, a higher-level device 50 is provided separately from the management device 20, records a terminal ID received from the corresponding terminal 10 and the corresponding remaining amount index to a detection list 52B at the higher-level device 50, and provides remaining amount information related to the battery BAT of the instrument 5 to a user by distributing the detection list 52B to the management device 20.

Specifically, the higher-level device 50 according to the present embodiment has a function to sequentially record the remaining amount index generated from the battery state received from each terminal 10 and indicating the remaining amount of the battery BAT to the detection list 52B in a storage unit 52 in association with the terminal ID received together with the battery state, and a function to provide information of the detection list 52B to the management device 20 through a wireless line.

The management device 20 also has a function to display remaining amount information related to the remaining amount of the battery BAT on a screen based on the detection list 52B as information provided from the higher-level device 50 through a communication line.

[Higher-Level Device]

Subsequently, the configuration of the higher-level device 50 according to the present embodiment will be described below in detail with reference to FIG. 18.

The higher-level device 50 is mainly achieved by an information processing device such as a server device and includes, as main functional components, a communication I/F unit 51, the storage unit 52, a terminal recording unit 53, and a distribution processing unit 54, and these functional components are connected with each other to perform data forwarding through an internal bus. Among these functional components, the terminal recording unit 53 and the distribution processing unit 54 are achieved through cooperation of a CPU with a program (both not illustrated).

The communication I/F unit 51 has a function to perform data communication with each terminal 10 through a wireless relay device 60 based on a short-distance wireless communication standard such as BLE, and a function to perform data communication with the management device 20 through the wireless relay device 60 based on the short-distance wireless communication standard such as BLE or based on a wireless communication standard such as Wi-Fi (recorded trademark).

The storage unit 52 is achieved by a storage device such as a hard disk or a semiconductor memory and has a function to store processing data and programs used for the remaining-battery-amount management processing at the higher-level device 50.

Main processing data stored in the storage unit 52 includes instrument information 52A and the detection list 52B. The instrument information 52A and the detection list 52B are the same as the instrument information 24A and the detection list 24B described above, and thus detailed description thereof will be omitted.

The terminal recording unit 53 has a function to compare a first detection duration and a second detection duration, determine whether recording of a terminal ID and the corresponding remaining amount index to the detection list 52B is permitted based on the length of an overlap duration in which the first and second detection durations overlap each other or the frequency of detection of the overlap duration, and sequentially record the terminal ID to the detection list 52B in accordance with determination that the recording is permitted. The first detection duration is a duration in which vibration of the instrument 5 is detected according to terminal-side vibration data wirelessly transmitted from the corresponding terminal 10 and received by the communication I/F unit 51 through the wireless relay device 60. The second detection duration is a duration in which vibration of the management device 20 is detected according to management-side vibration data wirelessly transmitted from the management device 20 and received by the communication I/F unit 51 through the wireless relay device 60.

Similarly to the terminal recording unit 25 described in the first embodiment, the terminal recording unit 53 may not use the management-side vibration data when sequentially recording, to the detection list 52B in the storage unit 52, each terminal ID received together with the terminal-side vibration data wirelessly transmitted from the corresponding terminal 10 in response to reception of the terminal-side vibration data.

The distribution processing unit 54 has a function to provide information by distributing the detection list 52B in the storage unit 52 from the communication I/F unit 51 to the management device 20 in response to a distribution request from the management device 20, and a function to convert each terminal ID in the detection list 52B into the instrument information 52A when distributing the detection list 52B. The instrument information of each terminal ID may be converted at the distribution processing unit 54 or may be converted at the management device 20 as described above.

The wireless relay device 60 has three functions described below. The first function is a function to accommodate the terminals 10 and the management device 20 through wireless lines and relay-connect the terminals 10 and the management device 20 to the higher-level device 50. The second function is a function to measure a standard time synchronized with a time management server (not illustrated) by accessing the time management server through a communication network. The third function is a function to, when relay-forwarding to the higher-level device 50 a terminal ID wirelessly transmitted from each terminal 10, notify the higher-level device 50 of the standard time at the relay-forwarding as the reception time of the terminal ID. Accordingly, the area of accommodation of the terminals 10 and the management device 20 can be significantly increased without degrading the accuracy of the reception time.

The wireless relay device 60 may include a parent device 61 and a child device 62 connected with each other through a wireless relay line. In this case, the child device 62 has a function to accommodate the terminals 10 and the management device 20 and relay-connect the terminals 10 and the management device 20 to the parent device 61 through the wireless relay line. The parent device 61 has a function to relay-connect, to the higher-level device 50, the terminals 10 and the management device 20 relay-connected through the child device 62, and when notifying the higher-level device 50 of reception times, correct the reception times based on a delay time through the wireless relay line, which is obtained through measurement in advance, and then notify the higher-level device 50 of the reception times. Accordingly, the area of accommodation of the terminals 10 and the management device 20 can be significantly increased without degrading the accuracy of the reception times.

Operation in Seventh Embodiment

Figure 19:
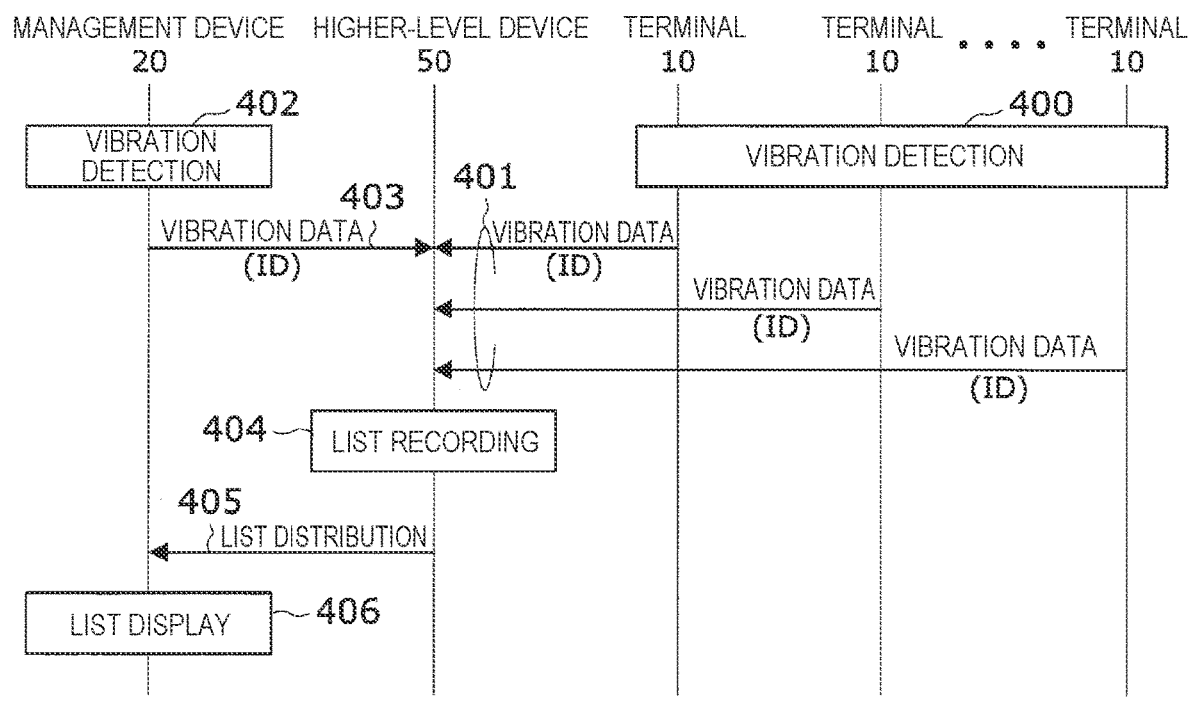
FIG. 19 is a sequence diagram illustrating the remaining-battery-amount management operation according to the seventh embodiment.

Subsequently, the operation of the remaining-battery-amount management system 1 according to the present embodiment will be described below with reference to FIG. 19. FIG. 19 is a sequence diagram illustrating the remaining-battery-amount management operation according to the seventh embodiment.

The following description will be made on an example in which, when the user having a bag in which a plurality of instruments 5 are stored departs, the remaining battery amount of each instrument 5 is checked on a smartphone of the user. Assume that a terminal 10 is mounted on the battery BAT of each instrument 5 in advance, and an application configured to achieve functions of the management device 20 is installed on the smartphone.

When the user lifts the bag in which the plurality of instruments 5 are stored, vibration of each instrument 5 is detected by the acceleration sensor 14 of the corresponding terminal 10 (step 400), terminal-side vibration data representing the vibration detection and the terminal IDs of the terminals are wirelessly transmitted at once from the wireless circuits 13 of the terminals 10 (step 401). Similarly, vibration of the management device 20 is detected is by the acceleration sensor 27 of the management device 20 (step 402), management-side vibration data representing the vibration detection is wirelessly transmitted from the wireless I/F unit 21 of the management device 20 (step 403).

The higher-level device 50 receives the terminal-side vibration data from each terminal 10 and the management-side vibration data from the management device 20 through the wireless relay device 60 by the communication I/F unit 51, and compares the first detection duration in which vibration of each instrument 5 according to the terminal-side vibration data is detected and the second detection duration in which vibration of the management device 20 is detected according to the management-side vibration data.

As the result of the comparison, whether recording of the terminal IDs, the remaining amount index, and the like to the detection list 52B is permitted is determined based on the length of an overlap duration in which the first and second detection durations overlap each other or the frequency of detection of the overlap duration, and the terminal IDs are sequentially recorded to the detection list 52B in accordance with determination that the recording is permitted (step 404).

The generation of vibration data from acceleration data (acceleration signal) and the threshold processing at the terminals 10 and the management device 20 are the same as those in FIG. 12 described above. The threshold processing of the acceleration data of the terminals 10 and the management device 20 may be performed at the terminal recording unit 53, which can lead to reduction of the number of circuit components and electric power consumption at the terminals 10 and the management device 20.

The comparison of the terminal-side vibration data and the management-side vibration data and the recording permission determination at the terminal recording unit 53 are the same as those in FIGS. 13 and 14 described above.

After the recording of the terminal IDs, the distribution processing unit 54 acquires the detection list 52B from the storage unit 52, converts the terminal IDs in the detection list 52B into the instrument information 52A, and then distributes the instrument information 52A from the communication I/F unit 51 to the management device 20 through the wireless relay device 60 (step 405).

The terminal management unit 26 of the management device 20 receives the detection list 52B from the higher-level device 50 through the wireless I/F unit 21 and displays the instrument information and the remaining amount indexes recorded in the detection list 52B on a screen at the display unit 23 as illustrated in FIG. 6 described above (step 406).

Thus, according to the present embodiment, the terminal IDs, the remaining amount indexes, and the like from the terminals 10 are not recorded in the detection list 52B when the management device 20 does not vibrate simultaneously with the terminals 10 in a case in which the management-side vibration data is used. As a result, the frequency of recording to the detection list 52B is reduced, and the number of recorded pieces of data is reduced. Accordingly, the user can check only the remaining battery amount of any terminal 10 vibrating simultaneously with a smartphone as the management device 20 based on the detection list 52B, and thus can easily recognize the detection list 52B displayed on a screen.

Extension of Embodiments

The present invention is described above with reference to embodiments but is not limited to the above-described embodiments. Configurations and specifications of the present invention may be provided with various changes that could be understood by the skilled person in the art within the scope of the present invention. In addition, the embodiments may be optionally combined without inconsistency.

REFERENCE SIGNS LIST 1 remaining-battery-amount management system
5 instrument
10 terminal
11 battery state detection circuit
12, 12A, 12B A/D converter
13 wireless circuit
14 acceleration sensor
15 use state determination circuit
20 management device
21 wireless I/F unit
22 operation input unit
23 display unit
24 storage unit
24A instrument information
24B detection list
24P program
25 terminal recording unit
26 terminal management unit
27 acceleration sensor
30 beacon terminal
50 higher-level device
51 communication I/F unit
52 storage unit
52A instrument information
52B detection list
53 terminal recording unit
54 distribution processing unit
60 wireless relay device
61 parent device
62 child device
BAT battery
L load circuit
SW switch

The invention claimed is:

1. A remaining-battery-amount management system comprising:
at least one terminal, each terminal of the at least one terminal respectively disposed on a battery of an instrument that is a management target, each terminal of the at least one terminal configured to wirelessly transmit a battery state obtained by detecting an electric property related to a remaining battery amount of the battery and wirelessly transmit a terminal ID identifying the terminal; and
a management device configured to:
sequentially record a remaining amount index, generated from each received battery state that indicates the remaining battery amount, to a detection list in a storage unit in association with the terminal ID received together with the battery state; and
display, on a screen, instrument information of the instrument and the remaining amount index corresponding to the terminal ID, wherein the instrument information comprises a name of each instrument on which each terminal of the at least one terminal is respectively disposed.

2. The remaining-battery-amount management system according to claim 1, wherein the instrument information of the instrument is registered in advance comprises pre-registered information for each terminal ID in the detection list.

3. The remaining-battery-amount management system according to claim 1, wherein the management device is further configured to:
in response to a particular instruction being input through an operation or in response to a beacon signal being received from a beacon terminal at a predetermined place, search the detection list for a low-remaining-amount terminal of the at least one terminal; and
give notification in at least one of a visible, audible, or vibrating manner in response to the low-remaining-amount terminal being found.

4. The remaining-battery-amount management system according to claim 3, wherein the remaining amount index of the low-remaining-amount terminal of the at least one terminal is equal to or smaller than a preset threshold index.

5. The remaining-battery-amount management system according to claim 1, wherein each terminal of the at least one terminal is configured to:
detect the battery state of the battery in response to a first vibration being detected by a built-in first acceleration sensor of the terminal; and
wirelessly transmit the battery state thus obtained and the terminal ID.

6. The remaining-battery-amount management system according to claim 5, wherein:
each terminal of the at least one terminal is configured to wirelessly transmit terminal-side vibration data in a duration in which the first vibration is detected;
the management device is configured to generate management-side vibration data in a duration in which a second vibration is detected by a built-in second acceleration sensor of the management device; and
the management device is configured to:
compare a first detection duration in which the first vibration of the instrument is detected according to the terminal-side vibration data and a second detection duration in which the second vibration of the management device is detected according to the management-side vibration data; and
determine whether recording to the detection list is permitted based on a length of an overlap duration in which the first and the second detection durations overlap each other or a frequency of detection of the overlap duration.

7. The remaining-battery-amount management system according to claim 6, wherein the management device is configured to record each terminal ID and the corresponding remaining amount index to the detection list only during a period from a time in which the terminal ID and the corresponding battery state are received until a record permission duration of a certain length elapses since a check that the length of the overlap duration has reached a preset determination duration.

8. The remaining-battery-amount management system according to claim 5, wherein each terminal of the at least one terminal further includes a use state determination circuit configured to:
compare a magnitude of the first vibration to a preset threshold level; and
determine that the instrument is in use based on a determination that the magnitude of the first vibration exceeds the preset threshold level.

9. The remaining-battery-amount management system according to claim 8, wherein each terminal of the at least one terminal is configured to wirelessly transmit the battery state and the terminal ID in response to a determination by the use state determination circuit that the instrument is in use.

10. The remaining-battery-amount management system according to claim 1, wherein each terminal of the at least one terminal further includes:
a use state determination circuit configured to:
compare a magnitude of a first vibration detected by a built-in first acceleration sensor of the terminal to a preset threshold level; and
determine that the instrument is in use in response to a determination that the magnitude of the first vibration exceeds the preset threshold level; and
a switch in connection between an electrode of the battery and a load circuit of the instrument, the switch configured to:
electrically connect the electrode and the load circuit by short-circuiting the switch only in a duration in which it is determined by the use state determination circuit that the instrument is in use; and
detect the battery state of the battery in a duration in which it is determined that the instrument is not in use.

11. The remaining-battery-amount management system according to claim 1, wherein, the management device is configured to check a preset record allowed duration to the terminal ID and record the terminal ID and the remaining amount index to the detection list only during a period in which a recording time corresponds to the preset record allowed duration.

12. A remaining-battery-amount management system comprising:
at least one terminal, each terminal of the at least one terminal respectively disposed on a battery of an instrument that is a management target, and each terminal of the at least one terminal configured to detect, as a battery state, an electric property related to a remaining battery amount of the battery and wirelessly transmit the battery state thus obtained and a terminal ID identifying the terminal;
a higher-level device configured to sequentially record a remaining amount index generated from each received battery state that indicates the remaining battery amount to a detection list in a storage unit in association with the terminal ID received together with the battery state; and
a management device configured to display instrument information of the instrument and remaining amount information related to the remaining battery amount on a screen based on the detection list configured to be acquired from the higher-level device through a communication line, wherein the instrument information comprises a name of each instrument on which each terminal of the at least one terminal is respectively disposed.

13. The remaining-battery-amount management system according to claim 12, further comprising a wireless relay device configured to accommodate the at least one terminal and the management device through wireless lines and relay-connect the at least one terminal and the management device to the higher-level device, wherein:
the wireless relay device is configured to measure a standard time synchronized with a time management server, and during relay-forwarding to the higher-level device the terminal ID wirelessly transmitted from each terminal of the at least one terminal, the wireless relay device is configured to notify the higher-level device of the standard time at the relay-forwarding as a reception time of the terminal ID; and as part of recording each terminal ID and the corresponding remaining amount index, the higher-level device is configured to record the reception time of the terminal ID, notification of which is given by the wireless relay device, to the detection list in association with the terminal ID.

14. The remaining-battery-amount management system according to claim 13, wherein:

the wireless relay device includes a parent device and a child device configured to be connected with each other through a wireless relay line;

the child device is configured to accommodate the at least one terminal or the management device and relay-connect the at least one terminal or the management device to the parent device through the wireless relay line; and the parent device is configured to relay-connect to the higher-level device the at least one terminal or the management device relay-connected through the child device, and while notifying the higher-level device of the reception time, the parent device is configured to correct the reception time based on a delay time through the wireless relay line, which is configured to be obtained through measurement in advance, and then notify the higher-level device of the corrected reception time.

15. A remaining-battery-amount management method comprising:

a step in which each terminal of at least one terminal, respectively disposed on a battery of an instrument that is a wireless target, wirelessly transmits a battery state obtained by detecting an electric property related to a remaining battery amount of the battery and a terminal ID identifying the at least one terminal; and a step in which a management device sequentially records a remaining amount index generated from each received battery state that indicates the remaining battery amount to a detection list in a storage unit in association with the terminal ID received together with the battery state and displays, on a screen, instrument information of the instrument and the remaining amount index corresponding to the terminal ID, wherein the instrument information comprises a name of each instrument on which each terminal of the at least one terminal is respectively disposed.

16. The remaining-battery-amount management method according to claim 15, wherein the instrument information of the instrument is registered in advance for each terminal ID in the detection list.

17. The remaining-battery-amount management method according to claim 15, wherein in response to a particular instruction being input through an operation or in response to a beacon signal being received from a beacon terminal at a predetermined place, the management device:

searches the detection list for a low-remaining-amount terminal of the at least one terminal; and gives notification in at least one of a visible, audible, or vibrating manner in response to the low-remaining-amount terminal being found.

18. The remaining-battery-amount management method according to claim 15, wherein each terminal of the at least one terminal:

detects the battery state of the battery in response to a first vibration being detected by a built-in first acceleration sensor of the terminal; and wirelessly transmits the battery state thus obtained and the terminal ID.

19. The remaining-battery-amount management method according to claim 18, wherein:

each terminal of the at least one terminal wirelessly transmits terminal-side vibration data in a duration in which the first vibration is detected;

the management device generates management-side vibration data in a duration in which a second vibration is detected by a built-in second acceleration sensor of the management device; and during recording of each terminal ID and the corresponding remaining amount index to the detection list, the management device:

compares a first detection duration in which the first vibration of the instrument is detected according to the terminal-side vibration data and a second detection duration in which the second vibration of the management device is detected according to the management-side vibration data; and determines whether recording to the detection list is permitted based on a length of an overlap duration in which the first and the second detection durations overlap each other or a frequency of detection of the overlap duration.

20. The remaining-battery-amount management method according to claim 19, wherein the management device records each terminal ID and the corresponding remaining amount index to the detection list only during a period from a time in which the terminal ID and the corresponding battery state are received until a record permission duration of a certain length elapses since a check that the length of the overlap duration has reached a preset determination duration.

* * * * *